(12) United States Patent
Slot et al.

(10) Patent No.: US 10,137,654 B2
(45) Date of Patent: Nov. 27, 2018

(54) MACHINE AND METHOD OF FORMING A BEAD-APEX ASSEMBLY FOR TIRES

(71) Applicant: VMI HOLLAND B.V., Gelriaweg (NL)

(72) Inventors: Marco Slot, Westerbork (NL); Gerard Johannes Van Laar, Vaassen (NL)

(73) Assignee: VMI HOLLAND B.V., Epe (NL)

( * ) Notice: Subject to any disclaimer, the term of this patent is extended or adjusted under 35 U.S.C. 154(b) by 476 days.

(21) Appl. No.: 14/398,216

(22) PCT Filed: Nov. 19, 2013

(86) PCT No.: PCT/NL2013/050831
§ 371 (c)(1),
(2) Date: Oct. 31, 2014

(87) PCT Pub. No.: WO2014/092558
PCT Pub. Date: Jun. 19, 2014

(65) Prior Publication Data
US 2015/0083307 A1   Mar. 26, 2015

(30) Foreign Application Priority Data

Dec. 10, 2012   (NL) ...................................... 2009946

(51) Int. Cl.
*B29D 30/48*     (2006.01)
*B29D 30/00*     (2006.01)

(52) U.S. Cl.
CPC ......... *B29D 30/48* (2013.01); *B29D 30/0016* (2013.01); *B29D 2030/0044* (2013.01); *B29D 2030/482* (2013.01); *Y10T 156/17* (2015.01)

(58) Field of Classification Search
CPC ............ B29D 30/1607; B29D 30/3007; B29D 30/48; B29D 2030/4468;
(Continued)

(56) References Cited

U.S. PATENT DOCUMENTS

| | | | | |
|---|---|---|---|---|
| 923,337 A | * | 6/1909 | Cowley | .................... E01B 25/24 |
| | | | | 104/107 |
| 2,754,708 A | * | 7/1956 | Peterson | ................ B25B 1/2421 |
| | | | | 269/224 |

(Continued)

FOREIGN PATENT DOCUMENTS

| | | |
|---|---|---|
| CA | 2180767 | 5/1997 |
| CN | 1649720 | 8/2005 |

(Continued)

OTHER PUBLICATIONS

Machine generated English language translation of SU 1593972 (originial document dated Sep. 1990).*

(Continued)

*Primary Examiner* — Martin K Rogers
(74) *Attorney, Agent, or Firm* — Young & Thompson

(57) ABSTRACT

A tire building machine for applying an apex to a bead to form a bead-apex assembly for a green tire, including a bead holder for holding the bead, wherein the tire building machine includes a first gripper and a second gripper for engaging and moving the apex in a direction of conveyance towards the bead, wherein the first gripper is moveable between a first start position and a first end position and the second gripper is moveable between a second start position and a second end position, wherein the tire building machine is provided with wedges, wherein the grippers are biased to a closed state in which the grippers are arranged to engage the apex, and wherein the wedges are arranged for countering the bias of the grippers when the grippers are at one of the start positions or the end positions.

15 Claims, 17 Drawing Sheets

(58) Field of Classification Search
CPC .................................. B29D 2030/4487; B29D 2030/421–2030/428; B29D 2030/481; B29D 2030/482; B25J 15/028; B25J 15/009
See application file for complete search history.

(56) References Cited

U.S. PATENT DOCUMENTS

| | | | |
|---|---|---|---|
| 3,839,532 A | 10/1974 | Drake | |
| 4,489,873 A * | 12/1984 | Yoshida | A44B 19/60 156/519 |
| 4,591,101 A * | 5/1986 | Fortnagel | F02M 61/06 239/453 |
| 4,804,426 A * | 2/1989 | Okuyama | B29D 30/3007 156/128.1 |
| 4,933,034 A | 6/1990 | Kokubu et al. | |
| 5,133,817 A | 7/1992 | Pizzorno | |
| 5,351,946 A * | 10/1994 | Kamoda | B65H 29/041 198/477.1 |
| 6,138,534 A | 10/2000 | Cho | |
| 6,379,493 B1 | 4/2002 | Berning et al. | |
| 2007/0256790 A1 * | 11/2007 | Nijhuis | B29D 30/48 156/422 |
| 2009/0266474 A1 | 10/2009 | Matsuyama et al. | |
| 2012/0111473 A1 * | 5/2012 | Hasegawa | B29C 65/7847 156/64 |

FOREIGN PATENT DOCUMENTS

| | | | |
|---|---|---|---|
| CN | 1984767 | 6/2007 | |
| RU | 2 173 253 C2 | 11/1998 | |
| SU | 1593972 | * 9/1990 | B29D 30/50 |

OTHER PUBLICATIONS

International Search Report, dated Feb. 21, 2013, from corresponding PCT application.
First Office Action dated Jan. 27, 2016, with English Translation; Chinese Patent Application No. 201380020554.1.
Decision of Grant issued in Application No. 2014151369/05(082221), dated Jun. 8, 2017.

* cited by examiner

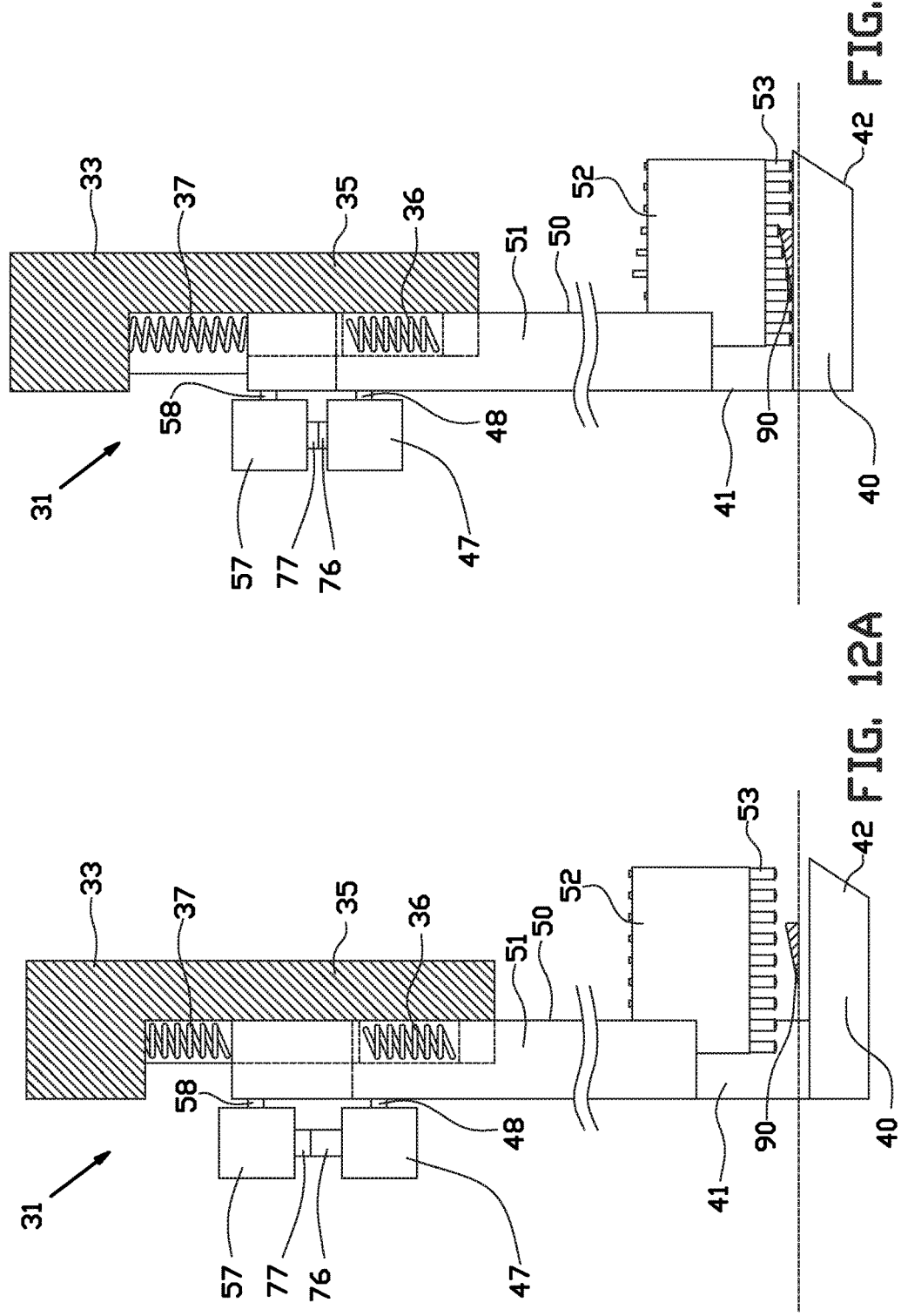

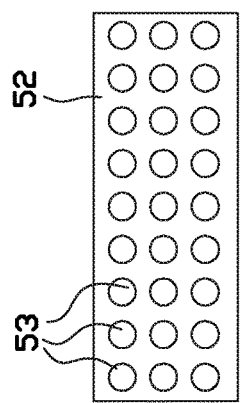
FIG. 12D
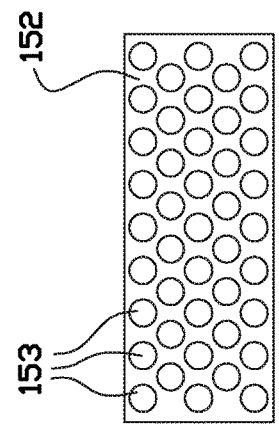
FIG. 12E
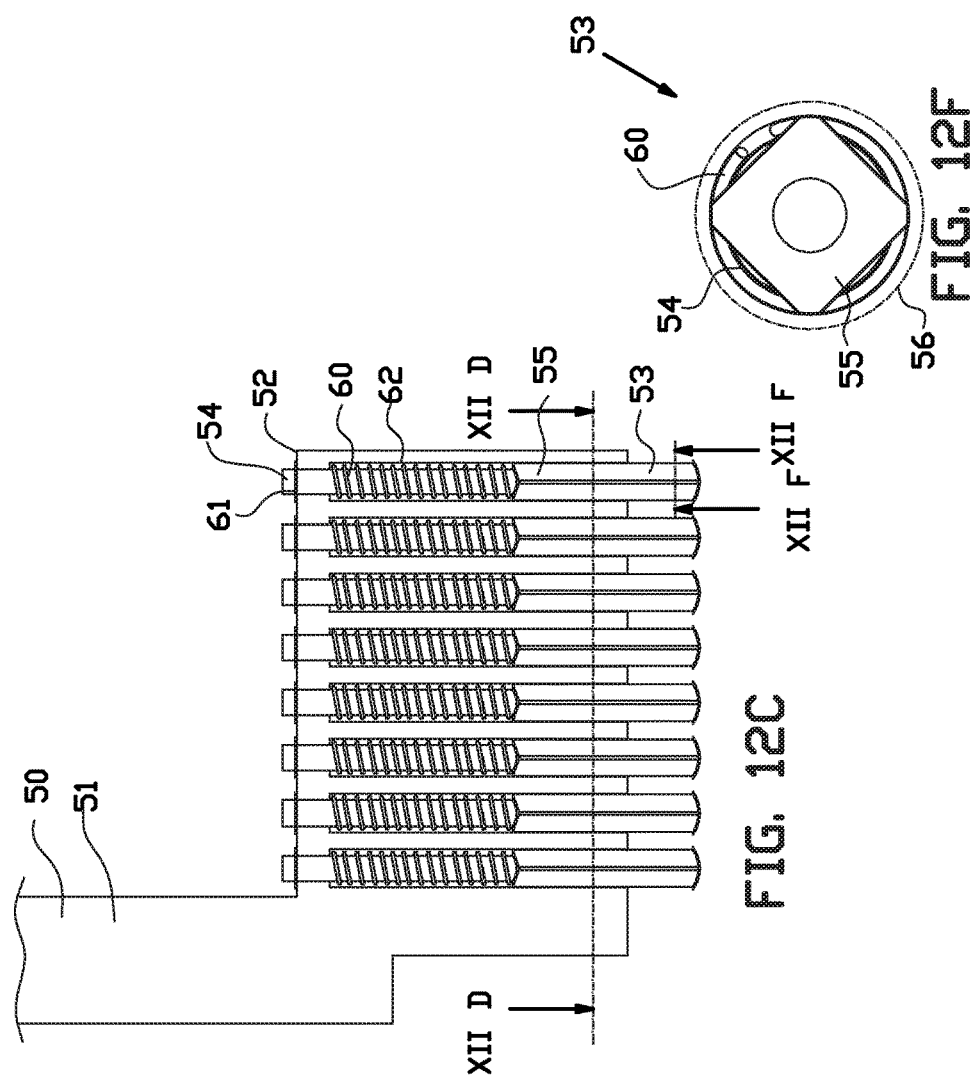
FIG. 12F
FIG. 12C

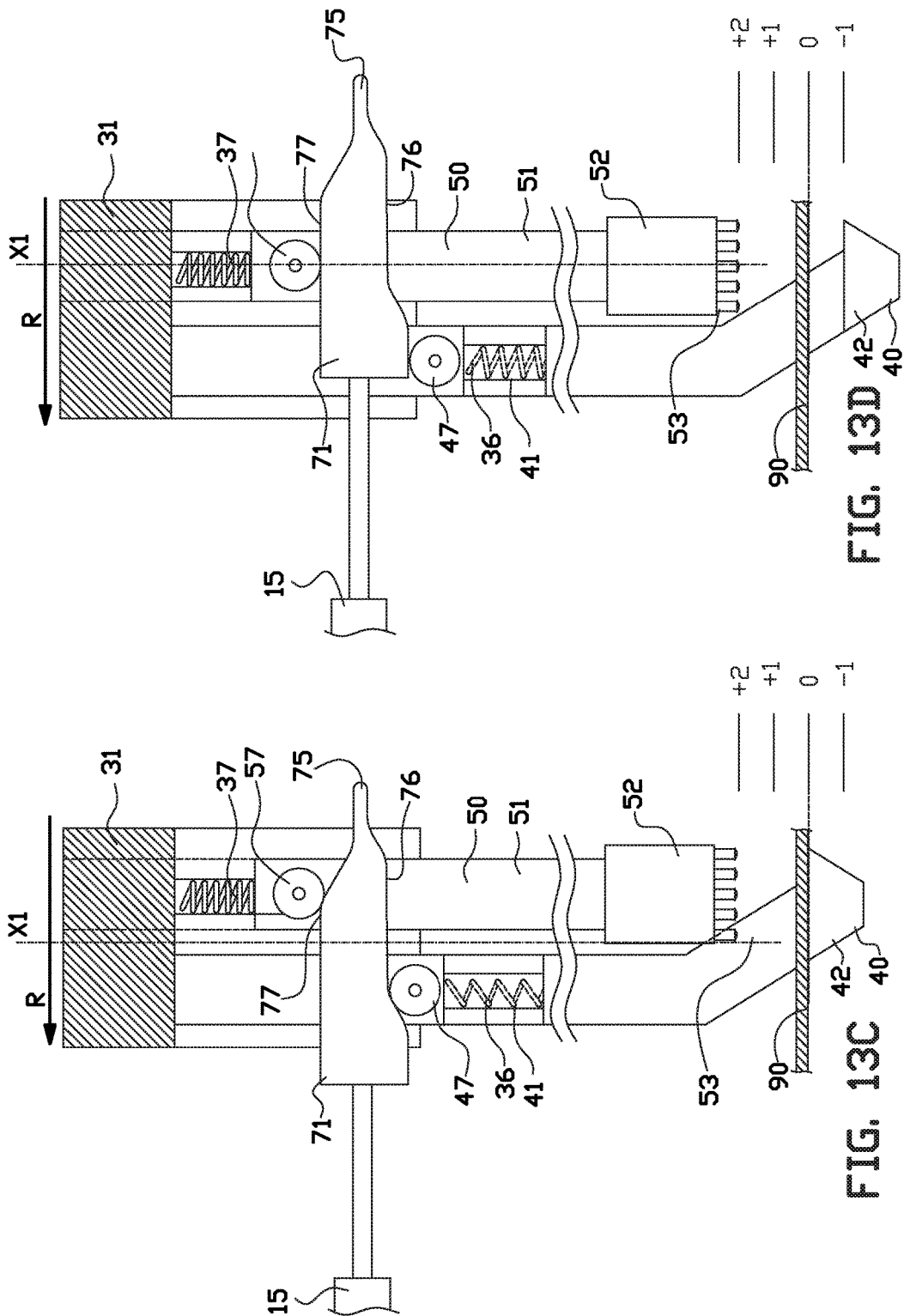

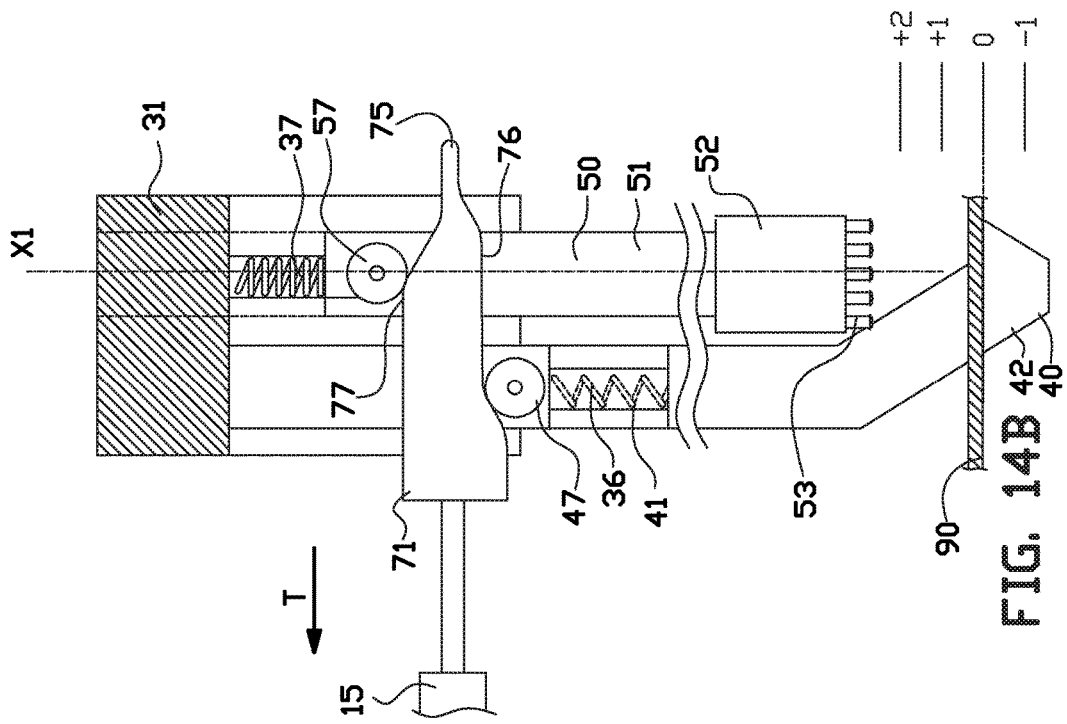
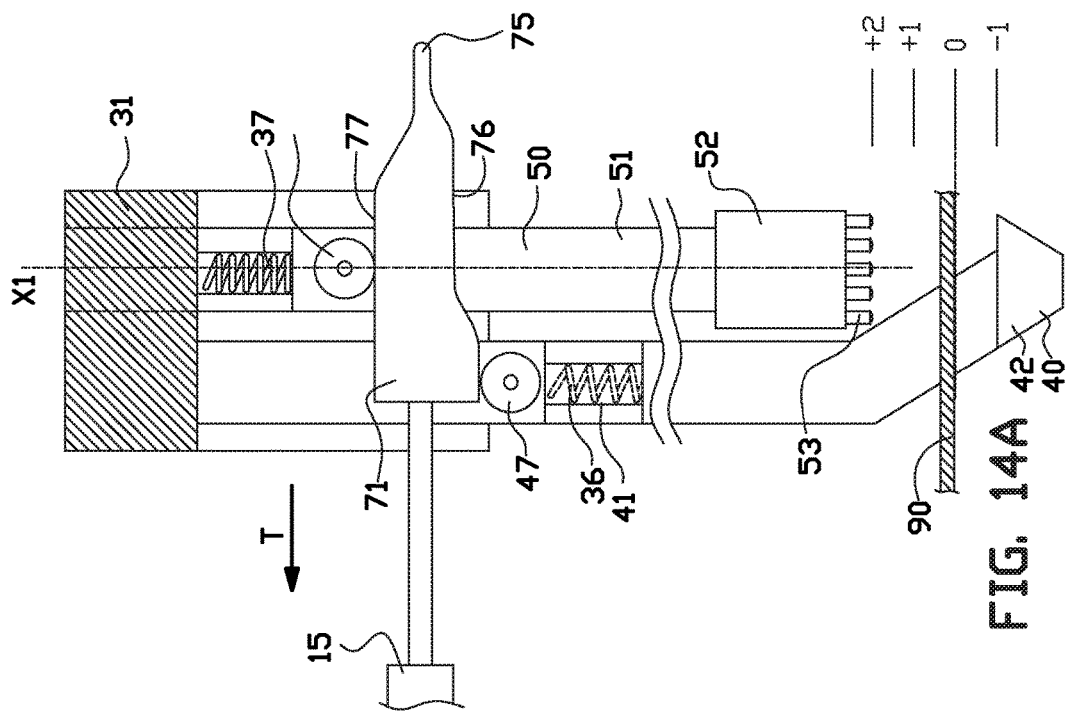

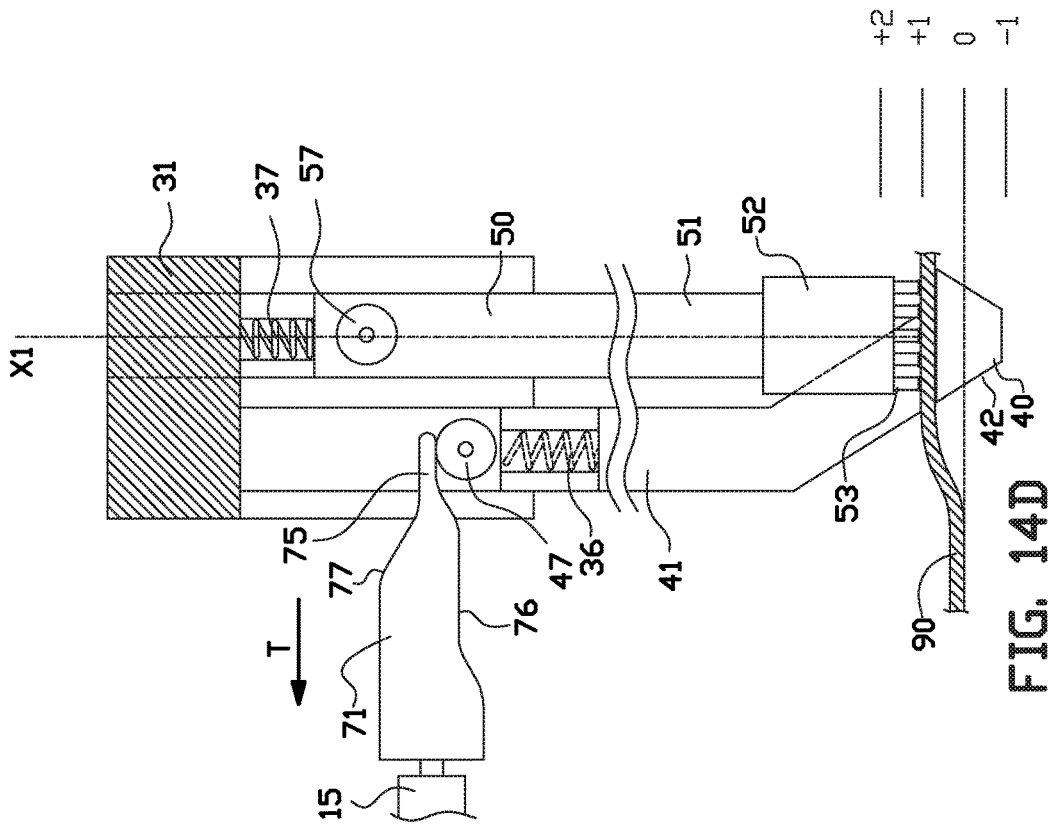
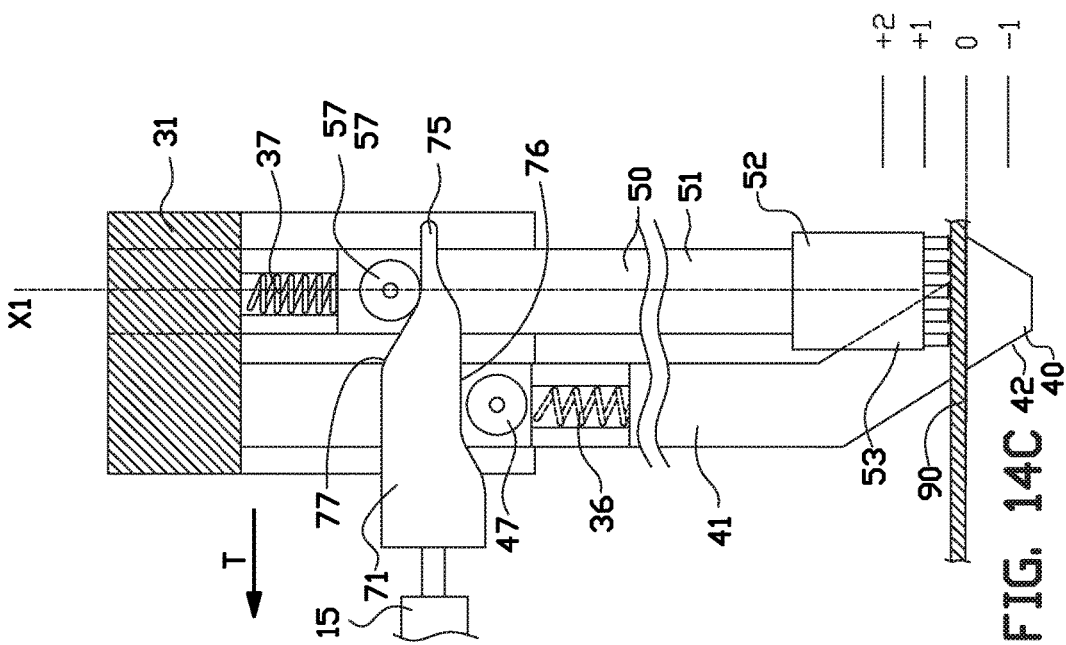
FIG. 14C
FIG. 14D

MACHINE AND METHOD OF FORMING A BEAD-APEX ASSEMBLY FOR TIRES

BACKGROUND

The invention relates to a tyre building machine for applying apex strips to beads to form a bead-apex assembly.

A tyre building machine for applying an apex strip to a bead to form a bead-apex assembly is known from European patent 1 755 874 B1. The known tyre building machine comprises a gripper for transporting the apex to the bead. The gripper is provided with jaws for engaging onto and disengaging from the apex strip. The jaws are controlled by drives in the form of pneumatic cylinders mounted on the gripper. The aforementioned tyre building machine is complex due to the couplings to be made to the drives of the gripper and the construction of the gripper itself.

It is an object of the present invention to provide an improved tyre building machine for applying apex strips to beads to form a bead-apex assembly.

SUMMARY OF THE INVENTION

According to a first aspect, the invention provides a tyre building machine for applying apex strips to beads to form a bead-apex assemblies for a green tyre, comprising a bead holder for holding the beads, wherein the tyre building machine comprises a first gripper and a second gripper for engaging and moving the apex strips in a direction of conveyance towards the bead, wherein the first gripper is moveable between a first start position and a first end position and the second gripper is moveable between a second start position and a second end position, wherein the tyre building machine is provided with a first wedge, a second wedge, a third wedge and a fourth wedge, wherein the first gripper and the second gripper are biased to a closed state in which the grippers are arranged to engage the apex strips, and wherein the wedges are arranged for countering the bias of the grippers when the grippers are at one of the start positions or the end positions.

The wedges can counter the bias of the grippers, thereby causing the disengagement of the grippers from the apex strips at the start positions or the end positions. As a result, the grippers themselves do not need to be provided with wedges and can therefore be of relatively simple construction.

In an embodiment the tyre building machine is arranged for conveying the apex strips in a first plane, wherein the first gripper and the second gripper are moveable between the first plane and a second plane in the background with respect to the first plane, wherein the grippers are arranged to be moved from their respective start positions to their respective end positions in the first plane and wherein the grippers are arranged to be returned from their respective end positions to their respective start positions in the second plane. The grippers can be returned through the second plane in the background while other steps of the method, such as cutting can be performed in the first plane without being hindered by the grippers. Additionally, the risk of damaging the apex in the first plane with the grippers is reduced.

In an embodiment the grippers are arranged to be moved from the first plane to the second plane and vice versa only when the grippers are in their respective start positions or end positions. Preferably, the grippers are arranged to be moved from the first plane to the second plane and vice versa only when they are halted in a stationary position with respect to the apex strips. In this manner, damage to the apex by relative movement of the grippers in the direction of conveyance can be prevented.

In an embodiment the grippers each comprise a first gripping member and a second gripping member, wherein at least one of the gripping members is biased by a biasing element to move towards the other of the gripping members for in cooperation with the other of the gripping members clamping the apex strips from two opposite sides, wherein the wedges are each provided with a protrusion which is arranged to counteract the bias of the biasing element. The at least one biased gripping member will automatically engage with the apex when its bias is not being countered by one of the wedges. Therefore, merely moving the wedges relative to the grippers can automatically cause the grippers to engage and disengage the apex.

In an embodiment the protrusion comprises a first run-on surface for displacing the one biased gripping member in a direction opposite to its bias. Since the wedge-shape alone can cause the displacement of the one biased gripping member, the wedge can be of relatively simple construction.

In an embodiment both of the gripping members are biased by biasing elements, wherein the protrusion is provided with a second run-on surface for displacing the other of the biased gripping members in a direction opposite to the bias of its biasing element. By biasing both gripping members, the apex can be actively engaged from two opposite sides. Since the wedge-shape alone can cause the displacement of both gripping members, the wedge can be of relatively simple construction.

In an embodiment the gripping members are each provided with a wheel for contacting and running over the respective run-on surfaces of the wedge. The wheels can reduce wear between the gripping members and the run-on surfaces.

In an embodiment the first wedge, the second wedge, the third wedge and the fourth wedge are positioned at or near the first start position, the first end position, the second start position and the second end position, respectively. The wedges can thus counter the bias of the grippers at the start positions or the end positions.

In an embodiment the tyre building machine is provided with drives which are coupled to the wedges for moving the wedges towards or retracting the wedges away from the grippers. The wedges can be actively controlled to be moved towards or retracted away from the grippers, while the grippers are stationary. This allows for the grippers to engage the apex strips while the grippers are stationary with respect to the apex strips, to prevent damaging the apex strips.

In an embodiment one of the gripping members is provided with a platform for supporting the apex strips and the other of the gripping members comprises a pressing element, wherein the pressing element comprises an array of pressure pins which face towards the platform, wherein the pressure pins are arranged for contacting the platform and the apex supported thereon. The pressure pins can ensure that pressure is applied evenly across the apex strips, regardless of the cross sectional shape of said apex strip. The evenly applied pressure prevents the apex strips from being squeezed sideways.

In an embodiment the pressure pins are biased to move towards the platform, wherein, when the gripping members are moved towards each other to engage the apex strips, at least some of the pressure pins are arranged for contacting the apex strips and are arranged to be pushed back against their bias as a result of said contact. As a result, the mutual positions of the pressure pins can be adapted to match the contour or profile of the apex, and as such, an even distribution of forces can be applied by the pressing element via the pressure pins onto the apex strips. In this manner, damage to the apex strips can be avoided.

In an embodiment the pressing element is provided with a plurality of cylindrical bores for receiving the pressure pins, wherein each pressure pin has a shaft which is arranged to slide within the cylindrical bore, wherein the shaft has a partly non-circular, multi-planar or flattened circumference which, in combination with the bore, creates a clearance between the shaft and the cylindrical bore, which clearance is in open communication with the outside environment at the side of the pressing element facing the platform. The shape of the pins can prevent residue from accumulating and eventually blocking the movement of the pins. Thus, malfunctioning of the pressure pins can be prevented, which reduces the chances of the pressure pins damaging the apex due to an uneven distribution of pressure forces.

In an embodiment the shaft has at least three parts of its circumference which are arranged to be placed in sliding contact with the cylindrical bore and at least three substantially flattened faces for, in the placed condition, creating at least three clearances between the shaft and the cylindrical bore. Preferably, the at least three substantially flattened faces are equally distributed along the circumference. Most preferably the shaft has a substantially square cross section.

In an embodiment the shaft is arranged to be rotatable within the cylindrical bore, wherein, preferably, the parts of the circumference of the shaft that are arranged to be in sliding contact with the cylindrical bore are parts of the same circle, preferably the same perfect circle. Because of the rotation, the parts of the circumference that are in sliding contact with the cylindrical bore can scrape of residues which may subsequently fall through the clearances and out of the cylindrical bore.

In an embodiment the tyre building machine further comprising a cutting device for cutting a substantially continuous length of apex into the subsequent apex strips having a leading end and/or a trailing end with respect to the bead, wherein the first gripper and the second gripper are arranged for engaging the leading end and the trailing end, respectively, of the apex strips. The leading end can be engaged by the first gripper to transport the associated apex strip towards the bead. The trailing end can be engaged by the second gripper to control the associated apex strip during its application onto the bead.

In an embodiment the cutting device is positioned upstream of the bead with respect to the direction of conveyance, wherein the first start position is located upstream of the cutting device and/or the second start position is located downstream of the cutting device. The first gripper can be moved into the first start position to engage with the leading end of a strip created just upstream of the cutting device. The second gripper can be moved into the second start position to engage with the trailing end of a strip created just downstream of the cutting device.

In an embodiment the tyre building machine further comprises an applicator clamp for transferring the leading end of one of the strips onto the bead at the bead holder, wherein the first end position is located at the applicator clamp and/or wherein the second end position is located at the bead holder. The first gripper can be moved into the first end position to transfer the leading end of one of the strips from the first gripper onto the applicator clamp. The second gripper can be moved into the second end position to transfer the trailing end of one of the strips onto the bead.

In an embodiment the tyre building machine further comprises a drive, preferably in the form of one or more timing belts, for driving the first gripper and the second gripper between their respective start positions and their respective end positions. The grippers can be driven in the foreground from their respective start positions to their respective end positions to convey the apex or apex strip. In the background, the grippers can be driven to return to their original start positions without damaging the apex.

In an embodiment the first gripper and the second gripper are placed on guides so as to be moveable in a direction parallel to the direction of conveyance. The apex, engaged by said grippers, can thus be moved along the guides, parallel to the direction of conveyance.

In an embodiment the tyre building machine is provided with a conveyor for supporting the apex strips along a substantially linear path parallel to the direction of conveyance, wherein, preferably, the linear path is tangential to the circumference of the bead held at the bead holder. The apex strips can be transported along the linear path towards the bead and can be fed towards and applied onto the beads in a tangential manner.

According to a second aspect, the invention provides a pressure pin for use in a cylindrical bore of a pressing element of a gripper for gripping an apex strip for a green tyre, wherein the pressure pin has a shaft which is arranged to be slidably placed in the cylindrical bore, wherein the shaft has a partly circular circumference which is arranged to be in sliding contact with the cylindrical bore and a partly non-circular, multi-planar or flattened circumference which, in combination with the bore, is arranged for creating a clearance between the shaft and the cylindrical bore, which clearance is in open communication with the outside environment at the side of the pressing element that faces the apex strip during use. The clearances can prevent residue from accumulating and eventually blocking the movement of the pins. The pressure pins can be subject to wear and should be replaced regularly. The pressure pins can be provided as spare parts.

In an embodiment the shaft has at least three parts of its circumference which are arranged to be placed in sliding contact with the cylindrical bore and at least three substantially flattened faces for, in the placed condition, creating at least three clearances between the shaft and the cylindrical bore. Preferably the at least three substantially flattened faces are equally distributed along the circumference. Most preferably, the shaft has a substantially square cross section. The shape of the pins can prevent residue from accumulating and eventually blocking the movement of the pins. Thus, malfunctioning of the pressure pins can be prevented, which reduces the chances of the pressure pins damaging the apex due to an uneven distribution of pressure forces.

In an embodiment the shaft is arranged to be rotatable within the cylindrical bore, wherein, preferably, the parts of the circumference of the shaft that are arranged to be in sliding contact with the cylindrical bore are parts of the same circle, preferably the same perfect circle. Because of the rotation, the parts of the circumference that are in sliding contact with the cylindrical bore can scrape of residues which may subsequently fall through the clearances and out of the cylindrical bore.

According to a third aspect, the invention provides a method for applying apex strips to beads to form a bead-apex assembly for a green tyre, wherein the method comprises the steps of engaging the apex strips with a first gripper and a second gripper and moving the engaged apex strips in a direction of conveyance towards the bead, wherein the first gripper is moveable between a first start position and a first end position and the second gripper is moveable between a second start position and a second end position, wherein the method further comprises the steps of biasing the grippers to a closed state in which they engage the apex strips, moving the grippers back and forth between their respective start positions and their respective end positions, and countering the bias of the grippers with wedges when the grippers are at one of the start positions or the end positions.

The wedges can counter the bias of the grippers, thereby causing the disengagement of the grippers from the apex strips at the start positions or the end positions. As a result, the grippers themselves do not need to be provided with wedges and can therefore be of relatively simple construction.

In an embodiment the grippers are moved in cycles, wherein each cycle comprises the steps of moving the grippers from their respective start positions to their respective end positions and returning the grippers from their respective end positions to their respective start positions. The cycles can be repeated as part of a substantially continuous process, wherein the end of each cycle is the beginning of a subsequent cycle.

In an embodiment the apex is conveyed in a first plane, wherein the first gripper and the second gripper are moveable between the first plane and a second plane in the background with respect to the first plane, wherein the grippers are moved from their respective start positions to their respective end positions in the first plane and wherein the grippers are returned from their respective end positions to their respective start positions in the second plane. The grippers can be returned through the second plane in the background while other steps of the method, such as cutting can be performed in the first plane without being hindered by the grippers. Additionally, the risk of damaging the apex in the first plane with the grippers is reduced.

In an embodiment the grippers are moved from the first plane to the second plane and vice versa only when the grippers are in their respective start positions or end positions. Preferably, the grippers are moved from the first plane to the second plane and vice versa only when they are halted in a stationary position with respect to the apex strips. In this manner, damage to the apex strips by relative movement of the grippers in the direction of conveyance can be prevented.

In an embodiment the wedges are inserted into or retracted from the grippers when the grippers are halted in their respective start positions or end positions. The wedges can be actively controlled to be moved towards or retracted away from the grippers, while the grippers are stationary. This allows for the grippers to engage the apex strips while the grippers are stationary with respect to the apex strips, to prevent damaging the apex strips.

In an embodiment, during each cycle of the grippers, a subsequent apex strip is engaged and transported by the first gripper towards the bead while another, previously transported apex strip is applied to the bead while being engaged by the second gripper. Due to the simultaneous handling of the new length of apex and the previously cut apex strip during one cycle, the process of transporting and applying the apex to the bead can be substantially accelerated.

In an embodiment the grippers simultaneously move from their respective start positions to their respective end positions. The leading end of one of the strips can be engaged and transported by the first gripper closely following or directly after the trailing end of the other, previously transported strip engaged by the second gripper. In this manner, considerable time can be saved preparing a subsequent strip to be applied. The time of a cycle can thus be reduced to less than ten seconds, in some cases even less than seven seconds.

In an embodiment the grippers simultaneously return from their respective end positions to their respective start positions. The grippers can be controlled in a synchronous manner, thereby reducing the complexity of the mutual movements.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 12A and 12B show side views of one of the grippers of the tyre building machine according to FIGS. 2 and 4;

FIG. 12C shows a detail of the gripper according to FIG. 12A;

FIG. 12D shows a cross sectional view of the detail of the gripper according to the line XII D-XII D in FIG. 12C;

FIG. 12E shows an alternative embodiment of the gripper according to FIG. 12D;

FIG. 12F shows a cross sectional detail of the gripper according to line XII F-XII F in FIG. 12C; and FIGS. 13A-D and 14A-D show front views of one of the grippers of the tyre building machine according to FIGS. 1, 3 and 5-11 during the steps of the method of forming a bead-apex assembly.

DETAILED DESCRIPTION OF THE INVENTION

FIGS. 1-11 show a tyre building machine 1 for applying a length of apex 90 of unvulcanized, elastomeric or rubber material, cut into apex strips 91, 92, to beads 95 to form a bead-apex assembly for a green tyre, according to an exemplary embodiment of the invention.

Figure 1:
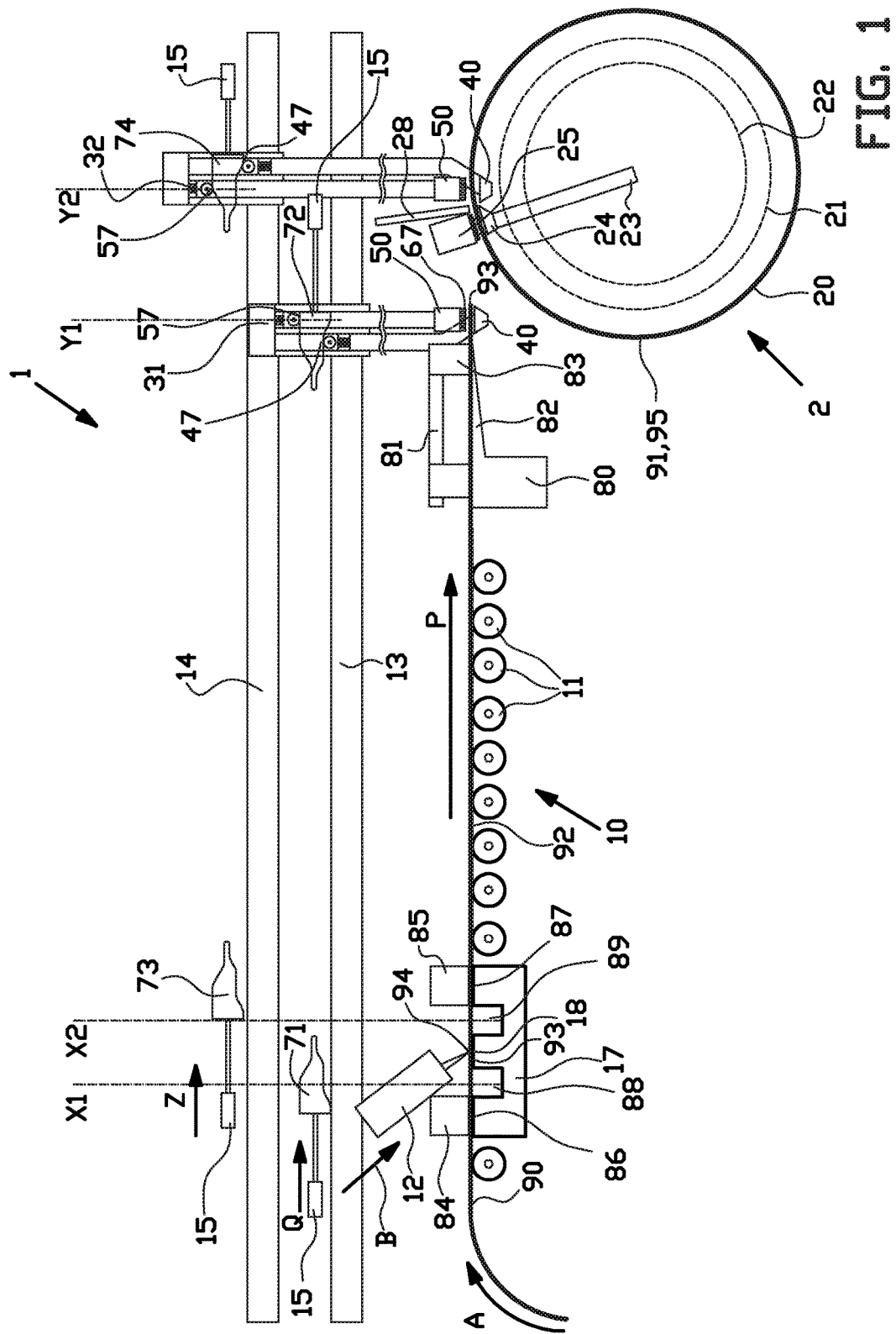
FIGS. 1, 3 and 5-11 show front views of a tyre building machine with grippers according to an exemplary embodiment of the invention, during the steps of a method of forming a bead-apex assembly.

As shown in FIG. 1, the tyre building machine 1 comprises a bead holder 2 for holding a bead 95 in an endless, substantially circular configuration. The bead holder 2 can be a drum having a physical circumferential surface 20 or a virtual drum path around which the bead 95 is shaped as if it were shaped around the physical circumferential surface 20. The bead holder 2 can be part of a turret (not shown). The configuration of the bead 95, in particular the diameter of the bead 95, can be varied by changing the diameter of the physical circumferential surface 20 or by altering the virtual drum path around which the bead 95 is shaped. Two alternative diameters of the physical circumferential surface 20 or the virtual drum path are indicated with reference numerals 21 and 22. The bead holder 2 comprises a rotatable drum clamp, bead-apex clamp or apex clamp 23 which is arranged to rotate coaxially with respect to the bead holder 2 and to clamp the apex 90 to the bead 95.

The tyre building machine 1 comprises a roller conveyor 10 with a plurality of passive rollers 11. On the upper side or transport side of the roller conveyor 10, the rollers 11 define a plane of conveyance over which the apex 90 can be transported along a substantially linear path in the direction of conveyance P. The relative heights of the roller conveyor 10 and the bead holder 2 are set or adjusted in such a way that the plane of conveyance is positioned with respect to the bead 95 for tangentially feeding the apex 90 in the direction of conveyance P towards the bead 95.

Above the plane of conveyance and parallel to the direction of conveyance P, the tyre building machine 1 is provided with a first guide rail 13 and a second guide rail 14. The tyre building machine 1 comprises a first gripper 31 and a second gripper 32 which are placed on the first guide rail 13 and the second guide rail 14 so as to be moveable in the longitudinal direction of the guide rails 13, 14. Two guide rails 13, 14 are preferred for good distribution of the forces of the grippers 31, 32 suspended on them and to reduce material costs. Alternatively, the tyre building machine 1 can be provided with a single, wide guide rail (not shown) onto which both grippers 31, 32 are placed. The tyre building machine 1 is provided with drives (not shown) which independently control the movement of the first gripper 31 along the first guide rail 13 between a first start position X1 and a first end position Y1 and the movement of the second gripper 32 along the second guide rail 14 between a second start position X2 and a second end position Y2. The drives can be linear motor arranged on the grippers 31, 32 or timing belts 68 arranged along the guide rails 13, 14, as shown schematically in FIG. 2.

Figure 2:
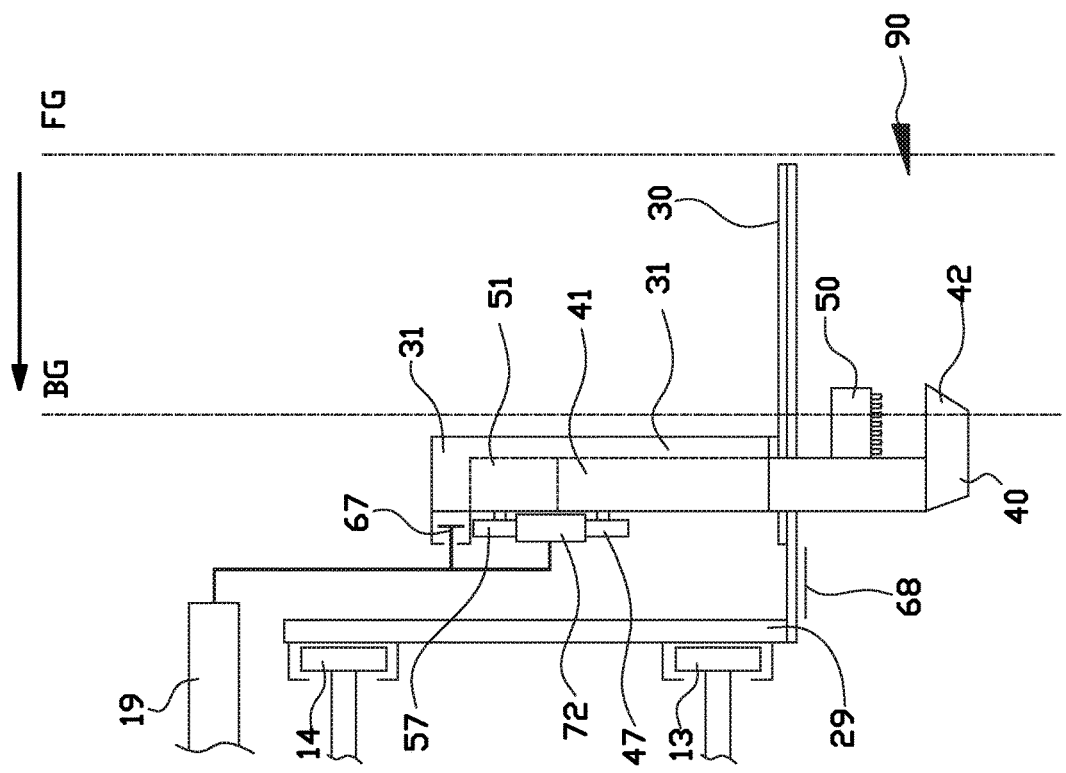
FIGS. 2 and 4 show side views of the tyre building machine according to FIGS. 1, 3 and 5-11, during the steps of the method of forming a bead-apex assembly.

In FIG. 2, the first gripper 31, the guide rails 13, 14 and the placement of the first gripper 31 on the guide rails 13, 14 are shown in sideview. The second gripper 32 is placed on the guide rails 13, 14 in a similar manner. The first gripper 31 is mounted on the guide rails 13, 14 via a frame 29. The frame 29 is provided with a slide guide 30 over which the first gripper 31 can be moved in a direction transverse to the direction of conveyance P. The first gripper 31 is mounted on a displacement rail 67 that runs parallel to the guide rails 13, 14. The displacement rail 67 is mounted on a drive or a set of drives 19, such as pistons or pushing/pulling arms, which are evenly distributed along the displacement rail 67. The drive 19 is arranged for moving the displacement rail 67 in a direction transverse to the direction of conveyance P. As a result, the first gripper 31 mounted on the displacement rail 67 is moved over the slide guide 30 of the frame 29 between a front plane or the foreground FG at the apex 90 and a rear plane or background BG which is in the background of or at a distance from the first plane or the foreground FG.

The tyre building machine 1 further comprises a cutting device 12 having a cutting knife which is placed above the plane of conveyance and an anvil 17 which is placed just underneath the plane of conveyance. The anvil 17 comprises a cutting surface 18 and two clamping surfaces 86, 87. The cutting knife of the cutting device 12 can moved onto the cutting surface 18 of the anvil 17 for cutting the length of apex 90 into an apex strip 91, 92 having a leading end 93 and a trailing end 94. The tyre building machine 1 is provided with two clamping blocks 84, which are arranged for moving towards the clamping surfaces 86, 86. The clamping blocks 84, 85 can be lifted upwards to move out of the way of the grippers 31, 32. In between the cutting surface 18 and the clamping surfaces 86, 87, the anvil 17 is provided with recesses 88, 89 for receiving the grippers 31, 32.

The length of the apex strip 91, 92 substantially corresponds to the circumferential length of the bead 95. If one of the alternative diameters 21, 22 for the bead 95 is used, the cutting device 12, the anvil 17 and the start positions X1, X2 of the grippers 31, 32 have to be adjusted to compensate for the shorter circumferential length of the bead 95. The first gripper 31 and the second gripper 32 are arranged to move into the recesses 88, 89 of the anvil 17 for engaging the apex 90 and/or the apex strip 91, 92, in a manner which will be described hereafter.

As the grippers 31, 32 are substantially similar to each other and function in a similar manner, only the first gripper 31 is shown in more detail in FIGS. 12A, 12B and 12C. The following description of the first gripper 31 does however also apply to the second gripper 32.

Figures 13A, 13B:
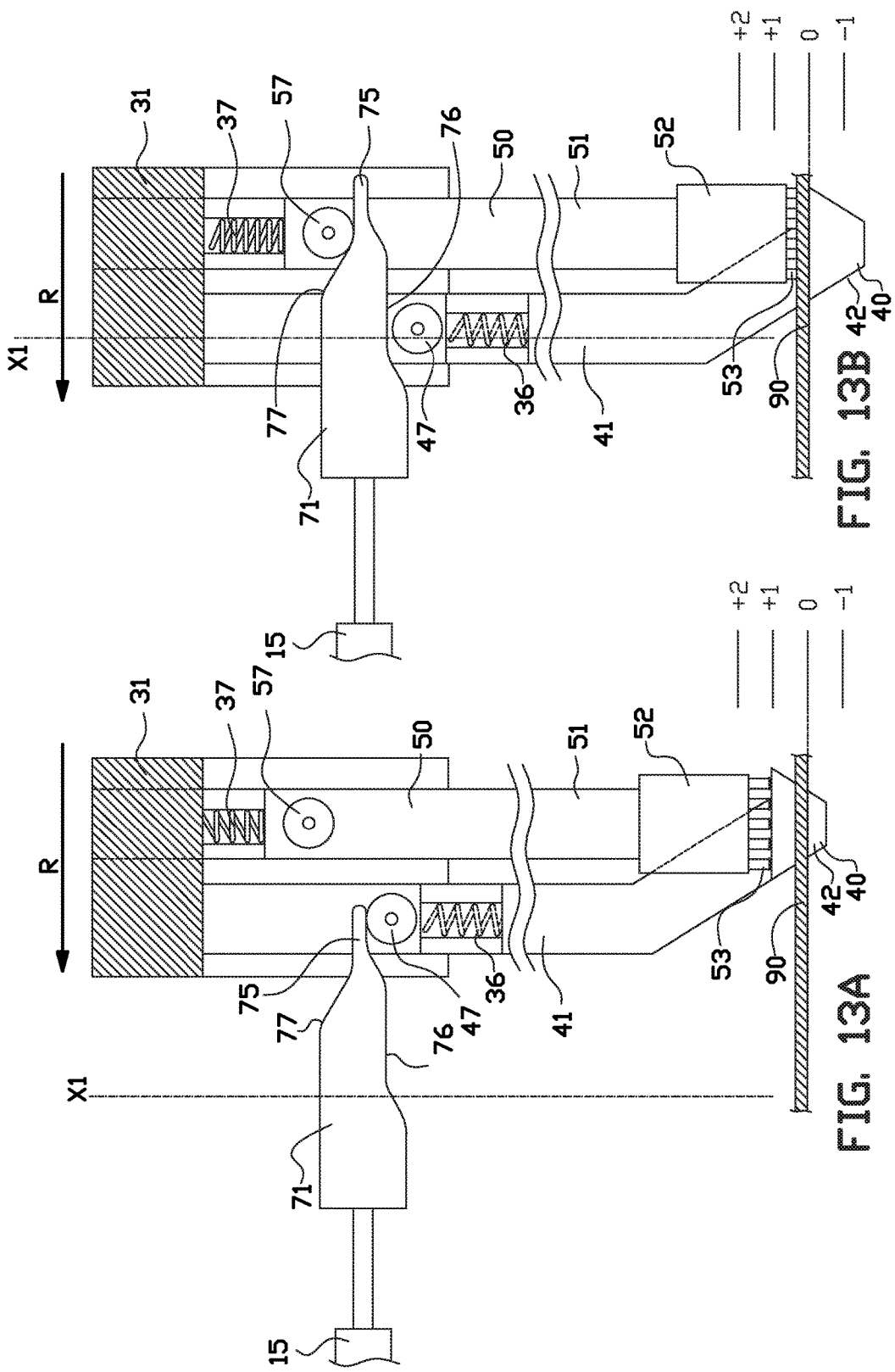

As shown in FIGS. 12A and 13D, the first gripper 31 is provided with a housing 33 from which a first gripping member 40 and a second gripping member 50 are suspended. The housing 33 is coupled to the drive 19 as shown in FIG. 2. The first gripping member 40 is suspended into a position underneath the plane of conveyance and the second gripping member 50 is suspended into a position above the plane of conveyance. The first gripper 31 is provided with a first biasing element in the form of a first spring 36 which biases the first gripping member 40 to move upwards towards the second gripping member 50 and a second biasing element in the form of a second spring 37 which biases the second gripping member 50 to move downwards towards the first gripping member 40. The first gripping member 40 and the second gripping member 50 are thus moveable towards each other from an open state into a closed state for, in mutual cooperation, clamping the apex 90 at the plane of conveyance from two opposite sides. The first spring 36 is stronger than the second spring 37, so that, when closed onto each other, the first gripping member 40 forces the second gripping member 50 upwards, as shown in FIGS. 13A and 14D.

The first gripping member 40 comprises a leg 41 extending vertically downwards from the housing 33 and a plateau or platform 42 at the distal end of the leg 41. The platform 42 is arranged for reaching underneath the plane of conveyance in a direction transverse to the direction of conveyance P, into the recesses 88, 89 of the anvil 17, for engaging the apex 90 from underneath the plane of conveyance. The second gripping member 50 comprises a leg 51 extending vertically downwards from the housing 33 and a pressing element 52 at the distal end of the leg 51. The pressing element 52 is aligned straight above the platform 42 of the first gripping member 40 for engaging the apex 90 from above the plane of conveyance.

As shown in FIGS. 12A and 13D, and more in detail in FIG. 12C-12F, the pressing element 52 is provided with a plurality of pressure pins 53 facing towards the platform 42. Each pressure pin 53 comprises a first, circular shaft part 54 which is slideably mounted in a cylindrical bore 62 of the pressing element 52 and a second shaft part 55 which extends from the bottom of the cylindrical bore in the pressing element 52. The second shaft part 55 has a partly circular circumference that is tightly fitted in or in sliding contact with the cylindrical bore 62 and a non-circular, multiplanar or flattened circumference. At the distal end of the second shaft part 55, the pressure pin 53 is provided with a conical, convex or slightly rounded head 56 for pressing against the apex 90. The pressure pin 53 furthermore comprises a spring 60 around the first shaft part 54 which spring-loads the pressure pin 53 to move downwards, towards the plane of conveyance. The spring load may also causes a slight rotation of the pressure pin 53 within the cylindrical bore 62 about the longitudinal axis of the spring 60. The pressure pin 53 is provided with a locking ring 61 that prevents the pressure pin 53 from falling through the cylindrical bore 62 of the pressing elements 52.

The shaft 54 of the pressure pin 53 can be pushed back against the force of the spring 60 over a short distance into the cylindrical bore of the pressing element 52. The pressure pins 53 are shaped in such a manner that residue such as dirt, dust or rubber does not accumulate and eventually block the movement of the pins 53. In particular, the non-circular, multiplanar or flattened circumferential surface or cross section of the second shaft part 55 reduces the sliding contact area of the second shaft part 55 with the cylindrical wall of the cylindrical bore. Preferably, the second shaft part 55 has at least three non-circular or flattened faces, more preferably a substantially square cross section with four equal faces, as shown in cross section in FIG. 12F, and optionally more than four non-circular or flattened faces. The flattened or non-circular faces of the second shaft part 55 are equally distributed along the circumference of the shaft part 55. The faces, in combination with the cylindrical wall of the cylindrical bore 62, create a clearance between the second shaft part 55 and the cylindrical bore 62. The clearance is in open communication with or open to the outside environment at the side of the pressing element 52 facing towards the platform 42. Under the influence of gravity, accumulating residue simply falls out of this clearance while the pressure pin 53 moves up and down through the cylindrical bore 62. During the up and down movement of the pressure pin 53, the spring 60 causes a slight rotation of the pressure pin 53 within the cylindrical bore 62, such that the parts of the second shaft part 55 that are in sliding contact with the cylindrical bore 62 can act as scrapers for scraping of the remaining residues.

The pressure pins 53 can be easily taken out of the pressing element 52 by removing the locking ring 61 and subsequently pulling the pressure pins 53 by their heads 56 from the cylindrical bores 59. This is of relevance as the pressure pins 53 are subject to wear and have to be replaced regularly by spare pressure pins 53.

As shown in FIG. 12D, the pins 53 are evenly distributed in rows and columns at the underside of the pressing element 52 to form a substantially square or rectangular grid or array of pressure pins 53. Alternatively, the pins 153 can be arranged differently at the underside of the pressing element 152, for example in a honeycomb configuration as shown in FIG. 12E. This configuration increases the density of pins 153 per surface area, which can lead to a more equal distribution of forces over the apex 90 and as a result, less imprints on the apex 90.

As shown in FIG. 12B, the array of pressure pins 53 of the second gripping member 50 is arranged for, in cooperation with the platform 42 of the first gripping member 50, contacting, abutting, clamping or gripping the apex 90. The second gripping member 50 is moved towards the first gripping member 40, thereby moving the pressing element 52 onto the platform 42 until the pressure pins 53 are just above the platform 42 and the apex 90 supported on the platform 42 is clamped between the pressure pins 53 and the platform 42. Due to the uneven, triangular cross sectional profile of the apex 90, some pressure pins 53 are pushed back further than other of the pressure pins 53. In this manner, the array of pressure pins 53 adapts to the profile of the apex 90 and evenly applies a gentle pressure onto the entire profile of the apex 90. The biasing force of the spring 60 and the shape of the head 56 are chosen such that, when the head 56 of the pressure pin 53 contacts the apex 90, the head 56 does not leave imprints on the apex 90. Preferably, the head 56 is as flat as possible, without loosing grip on the apex 90.

As shown in FIGS. 12A and 12B, the first gripping member 40 is provided with a first wheel 47 which is rotatably mounted on an axle 48. The axle 48 is fixedly attached to the leg 41 of the first gripping member 40. The second gripping member 50 is provided with a second wheel 57 which is rotatably mounted on an axle 58. The axle 58 is fixedly attached to the leg 51 of the second gripping member 50. The axles 48, 58 are positioned with respect to the legs 41, 51 in such a manner that the wheels 47, 57 are positioned at a short distance from each other.

As shown in FIG. 1, the tyre building machine 1 is provided with a first wedge 71 and a second wedge 72 which are positioned at or near the first start position X1 and the first end position Y1, respectively, for the first gripper 31. The tyre building machine 1 is provided with a third wedge 71 and a fourth wedge 72 which are positioned at or near the second start position X2 and the second end position Y2, respectively, for the second gripper 32. The tyre building machine 1 is provided with drives 15, such as pistons or linear drives, which are arranged for actively controlling the positions of or moving the wedges 71-74 towards or away from their respective positions X1, X2, Y1, Y2, and thus for moving the wedges 71-74 towards and away from the grippers 31, 32 when they are in one of the positions X1, X2, Y1, Y2.

As shown in FIGS. 13A-D, each wedge 71-74 comprises a protrusion 75 which is directed at the respective gripper 31, 32. In FIGS. 13A-D, only the first gripper 31 is shown. In the biased state, the wheels 47, 57 of the first gripper 31 are at a distance from each other which is smaller than the protrusion 75. Considered in the longitudinal direction of the guide rails 13, 14, the wheels 47, 57 are arranged to come into abutment with the protrusion 75, preferably with the first wheel 47 first. As shown in FIGS. 1-11, the grippers 31, 32 are controlled by their respective linear drives or timing belts to move in cycles from their respective end positions Y1, Y2 to their start positions X1, X2 and back again. When the grippers 31, 32 are at the start positions X1, X2 and at the end positions Y1, Y2, the respective wedges 71-74 are driven between the grippers 31, 32 by their respective drives 15. The wedges 71-74 are forced or driven between the wheels 47, 57 of the first gripping member 40 and the second gripping member 50, thereby driving apart the gripping members 40, 50 against the bias of their respective biasing elements 36, 37.

As shown in more detail in FIGS. 13A-13D, the protrusion 75 of each wedge 71-74 comprises a first run-on surface 76 and a second run-on surface 77. The run-on surface 76, 77 converge into a wedge-shape which is to be inserted into or retracted from the middle between the first wheel 47 and the second wheel 57 of the respective gripper 31, 32. The first run-on surface 76 is arranged to come into abutment with the first wheel 47 and to displace the first wheel 47 in a downward direction against the force of the first biasing element 36. The second run-on surface 77 is arranged to come into abutment with the second wheel 57 and to displace the second wheel 57 in an upward direction against the force of the second biasing element 37. The displacement of the wheels 47, 57 causes the respective gripping members 40, 50 to move apart.

The profiles or curvatures of the run-on surfaces 76, 77 are designed based on the desired behavior of the gripping members 40, 50 they are displacing. In this example, the run-on surfaces 76, 77 have a smooth design with linear sections that blend into each other via rounded transitions. Also, the run-on surfaces 76, 77 are designed such that the first wheel 47 will come into contact with the first run-on surface 76 before the second wheel 57 comes into contact with the second run-on surface 77. It will however be apparent to one skilled in the art that other run-on surfaces can be developed causing similar or equivalent behavior. The run-on surfaces 76, 77 can for example be divided in more sections, less sections or sections with a smoother or more linear shape, or a combination thereof. In a particular embodiment (not shown), the profile of the second run-on surface 77 at the bottom of the protrusion 75 of the fourth wedge 74 has less height difference than the other wedges 71-73, so that the first gripping member 40 of the second gripper 32 is only slightly opened. This allows for the trailing end 94 of the subsequent apex strip 92 to be released within the limited space available at the bead holder 2 near the second end position Y2.

FIGS. 13A-13D schematically show four subsequent stages of insertion of the first wedge 71 in between the wheels 47, 57 of the first gripper 31 when the first gripper 31 is in the background BG as shown in FIG. 2. These stages are also representative for the second gripper 32 and the third wedge 73. In FIG. 13D, the gripping members 40, 50 of the first gripper 31 have fully moved apart and the first gripper 31 will have moved to a fully opened state. In order to illustrate the extent of the displacement, reference lines have been added indicating the height levels of the gripping members 40, 50, wherein the '0' level is the level of the plane of conveyance or the cutting surface 18 of the anvil 17. The levels '+1' and '+2' indicate relative levels higher than the plane of conveyance and the level '−1' indicates a relative level beneath the plane of conveyance. FIGS. 14A-14D schematically show four subsequent stages of retraction of the first wedge 71 from in between the wheels 47, 57 of the first gripper 31 when the first gripper 31 is in the foreground FG according to FIG. 4. The wheels 47, will be allowed to again move towards each other as biased by the biasing elements 36, 37. As a result, the respective gripping members 40, 50 will move towards each other and the first gripper 31 will move into a closed state, in which the first gripper 31 will gently engage the apex 90.

As shown in FIG. 1, the tyre building machine 1 further comprises an applicator clamp 80 for receiving the apex 90 from the first gripper 31 and transferring the apex 90 to the apex clamp 23. To this end, the applicator clamp 80 comprises a clamping arm 81 for clamping the apex 90 and a platform 82 for supporting the clamped apex 90 in the plane of conveyance. In this example, the clamping arm 81 is provided with a pressure element 83 having the same pressure pins as described in relation to the grippers 31, 32. In a similar manner, the apex clamp 23 may also be similar in operation to the grippers 31, 32, in that it is provided with a platform 24 and a pressure element 25 having the same pressure pins as described in relation to the grippers 31, 32.

In the following description, the method of applying the apex 90 to the bead 95 to form a bead-apex assembly for a green tyre will be described on the basis of FIGS. 1-11, with occasional reference to details of FIGS. 12A-12F, 13A-13D and 14A-D.

FIGS. 1-11 show the steps of one cycle of the grippers 31, 32 during a substantially continuous process. The continuous process generally involves multiple cycles of the grippers 31, 32, while repeatedly cutting the substantially continuous apex 90 into a subsequent strip 92 and subsequently transporting and applying said subsequent strip 92 to subsequent beads 95 at the bead holder 2.

Generally, at the starting point of an exemplary cycle, a previous apex strip 91 has been applied around a bead 95 and the resulting bead apex assembly 91, 95 is ready to be removed from the bead holder 2. In the meantime, a subsequent length of the apex 90 is being cut off by the cutting device 12 from a freshly extruded apex into a subsequent strip 92 with a definite length. Subsequently, the grippers 31, 32 are returned to their starting positions X1, X2, to pick up the leading end 93 of the remaining freshly extruded apex 90 and to guide the trailing end 94 of the subsequently cut apex strip 92 towards the bead 95. The leading end 93 of the extruded apex 90 is moved towards the bead 95 and subsequently transferred by the applicator clamp 80 to the apex clamp 23, while, in the same movement the trailing end 94 of the subsequent strip 92 is being applied to the bead 95.

During each transport of the trailing end 94 of a subsequent strip 92 by the second gripper 32 from the second start position X2 to the second end position Y2, the leading end 93 of a newly extruded apex 90 is already engaged by the first gripper 31 and is transported from the first start position X1 to the first start position Y1 towards the bead 95, where it is transferred by the applicator clamp 80 to the apex clamp 23. In this manner, in each following cycle, the first gripper 31 can closely follow or move together with the second gripper 32, thereby transporting and preparing a freshly extruded apex 90 to be cut into a definite length for subsequent application as a subsequent apex strip 92 to the bead 95 directly upstream of the previously applied strip 91.

In the following description, only one cycle of the grippers 31, 32 is described in more detail.

In FIG. 1, the situation is shown wherein a previous apex strip 91 has been previously applied to a bead 95 on the bead holder 2. The steps of applying the previous apex strip 91 will not be described here, as these steps will be described hereafter in relation to subsequent strip 92 in a subsequent cycle. The wedges 72, 74 have caused the gripping members 40, 50 of the grippers 31, 32 to move apart. The first gripper 31, the second gripper 32 and the apex clamp 23 are opened. The bead-apex assembly 91, 95 can now be removed.

During the previous cycle, a freshly extruded, continuous apex 90 has originated from an extruder (not shown) and has been fed towards the anvil 17 as indicated with feed arrow A. Its leading end 93 has been transported by the first gripper 31 during a previous cycle of the grippers 31, 32. The steps of transporting the leading end 93 of the freshly extruded apex 90 will not be described here, as these steps will be described hereafter in relation to the subsequent cycle. For now, it is important to notice that the freshly extruded apex 90 is clamped by the applicator clamp 80 near its leading end 93. The grippers 31, 32 are in their respective end positions Y1, Y2.

As shown in FIG. 1, the new cycle is started by clamping the freshly extruded apex 90 on both sides of the cutting surface 18 by the clamping blocks 84, 85 and at its leading end 93 by the applicator clamp 80 to fix its position. This clamping of the freshly extruded apex 90 can already be performed during the last steps of the previous cycle, as will be illustrated later on. After clamping, the knife of the cutting device 12 is moved in a cutting direction B to cut the freshly extruded apex 90 at the anvil 17 into a subsequent apex strip 92 with a desired length. The cut creates a trailing end 94 for the subsequent apex strip 92 downstream of the anvil 17 and at the same time creates a leading end 93 for the remaining freshly extruded apex 90 upstream of the anvil 17.

In FIG. 1, the first gripper 31 and the second gripper 32 are halted, stopped or stationary with respect to the apex 90 in their respective end positions Y1, Y2. In their end positions Y1, Y2, the gripping members 40, 50 have been moved apart by the wedges 72, 74, such that the platform 42 and the pressing element 52 have gently released the apex 90. The grippers 31, 32 can thus be safely retracted from the foreground FG into the background BG without damaging the apex 90, as shown with the arrow in FIG. 2.

In the situation as shown in FIG. 1, the wedges 71, 73 at the start positions X1, X2 are moved in a controlled manner by their respective drives 15 in the directions indicated with arrows Q and Z, to prepare for the arrival of the grippers 31, 32 at the start positions X1, X2.

Figure 3:
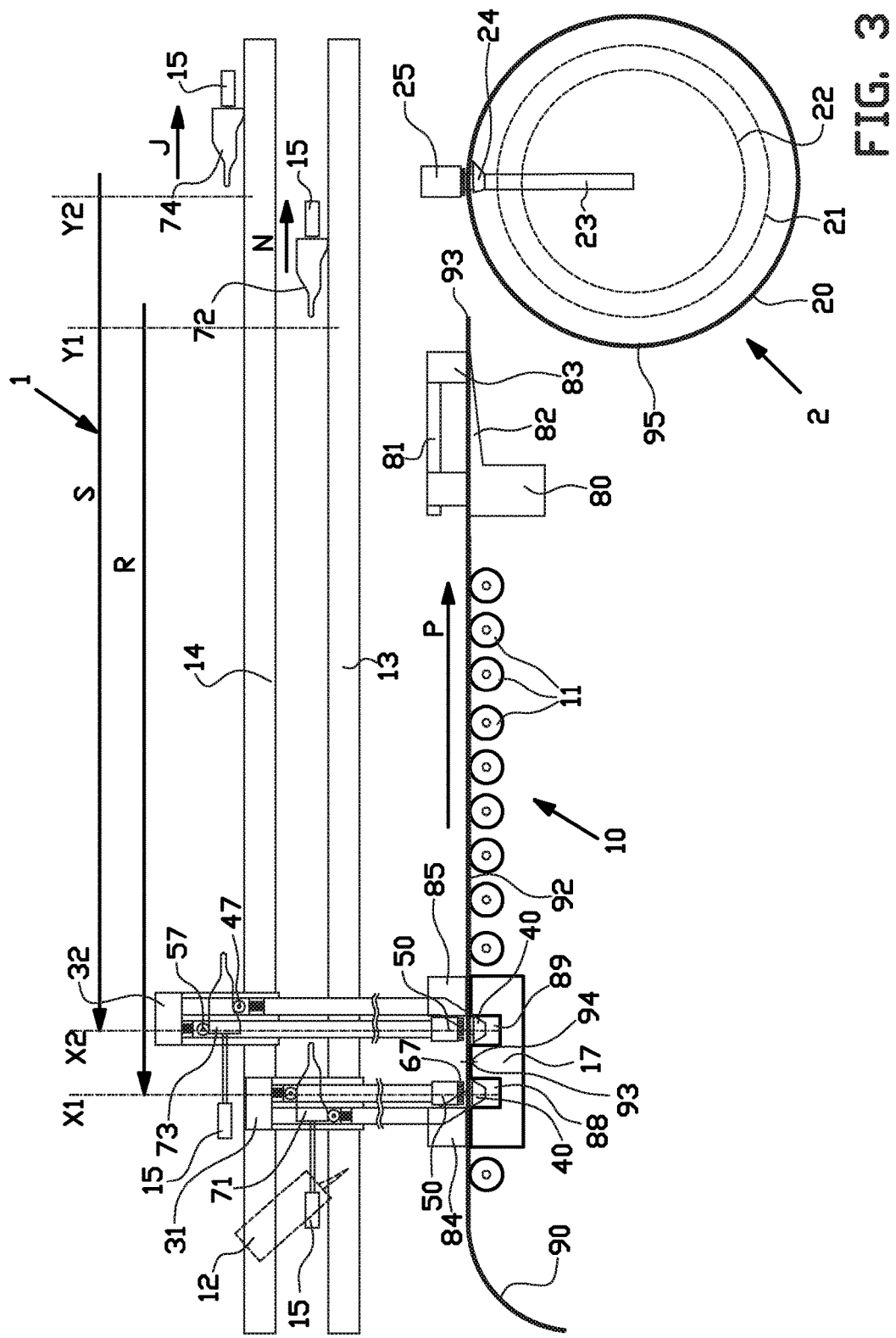
Figure 4:
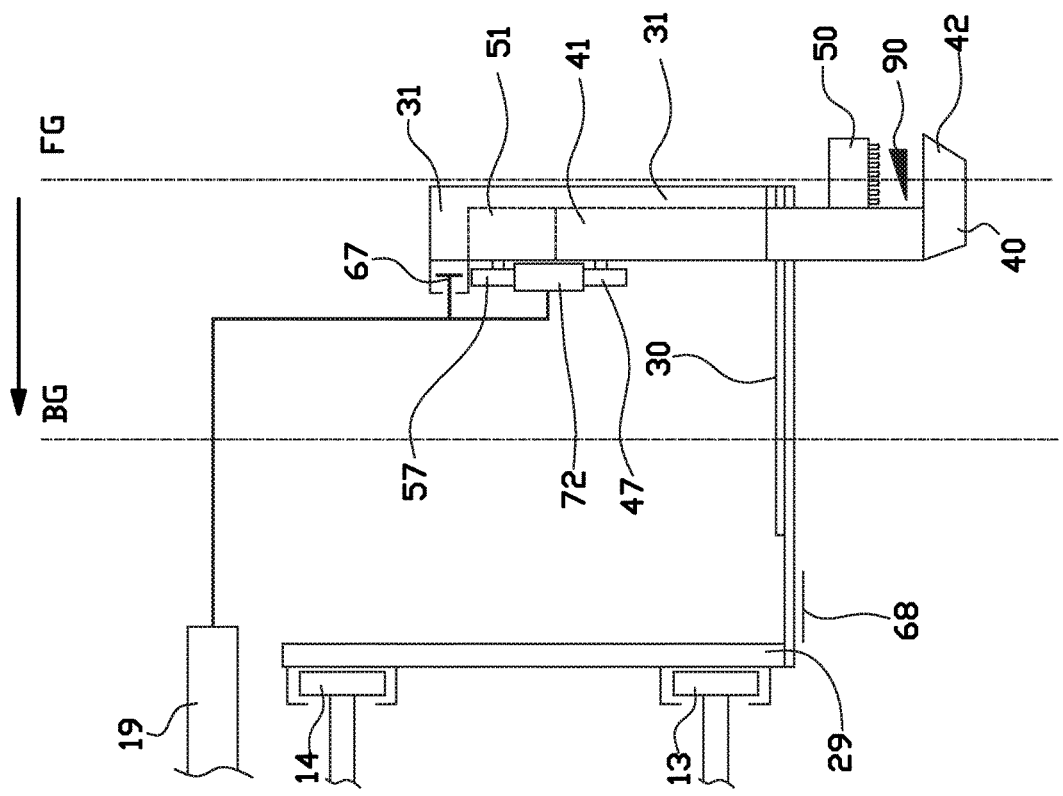

In FIG. 3, the situation is shown wherein the previously assembled bead-apex assembly 91, 95 has been removed from the bead holder 2 and a new bead 95 is placed on the bead holder 2. During or shortly after cutting the freshly extruded apex 90 into the subsequent apex strip 92, the timing belts or the linear drives of the grippers 31, 32 have been actuated to move the grippers 31, 32 in the background BG along the guide rails 13, 14 back to their respective start positions X1, X2, as shown with retraction arrows R and S. After the grippers 31, 32 have left their end positions Y1, Y2, the wedges 72, 74 at the end position Y1, Y2 are retracted by their respective drives 15 in the directions indicated with arrows J and N to prepare for the next arrival of the grippers 31, 32 at the end positions Y1, Y2.

When both grippers 31, 32 arrive at their respective start positions X1, X2, they are immediately driven fully onto their respective wedges 71, 73. This save time in the cycle but is not essential. The grippers 31, 32 can also arrive at the start positions X1, X2 after which the wedges 71, 73 are controlled to counter the bias. The wedges 71, 73, both extended towards the grippers 31, 32 by their respective drives 15 drive the gripping members 40, 50 apart into the open state. In FIGS. 13A-D, the subsequent steps of opening the first gripper 31 are shown in more detail. The second gripper 32 is opened in a similar manner.

FIG. 13A shows the situation wherein the gripping members 40, 50 of the first gripper 31 are moved towards each other in accordance with their bias into a closed state. The force of the first spring 36 acting on the first gripping member 40 is greater than the force of the second spring 37 acting on the second gripping member 50. As a result, the gripping members 40, 50 have moved together into a lifted position, slightly above the plane of conveyance, as indicated with the line '+1'.

FIG. 13B shows the situation wherein the first gripper 31 has moved further in the return direction R. The first wheel 47 of the first gripping member 40 has come into abutment and has moved along the underside of the first run-on surface 76 of the first wedge 71. The run-on surface 76 has displaced the first gripping member 40 to move downwards to the '0' level. Again, due to the ratio between the biasing forces, the second gripping member 50 has moved together with the first gripping member 40 to the '0' level.

FIG. 13C shows the situation wherein the first gripper 31 has moved further in the return direction R. The first wheel 47 has moved further along the underside of the first run-on surface 76, but is not yet displaced further downwards. The second wheel 57 has come into abutment with the second run-on surface 77 and has now been displaced in the upwards direction. As a result, the second gripping member 50 has moved to the '+2' level, well above the apex 90 in the foreground.

FIG. 13D shows the situation wherein the first gripper 31 has arrived in the first start position X1. The first gripper 31 is now fully driven onto the first wedge 71. The first gripping member 40 has been maximally displaced by the first run-on surface 76 to the '−1' level, slightly below the apex 90 in the foreground.

In the situation as shown in FIG. 3, the first gripper 31 and the second gripper 32 are halted, stopped or stationary with respect to the apex 90 in their respective start positions X1, X2, both in the opened state as shown in FIG. 13D. The grippers 31, 32 can thus be safely moved from the background BG into the foreground FG without damaging the apex 90, as shown with the arrow in FIG. 4.

Figure 5:
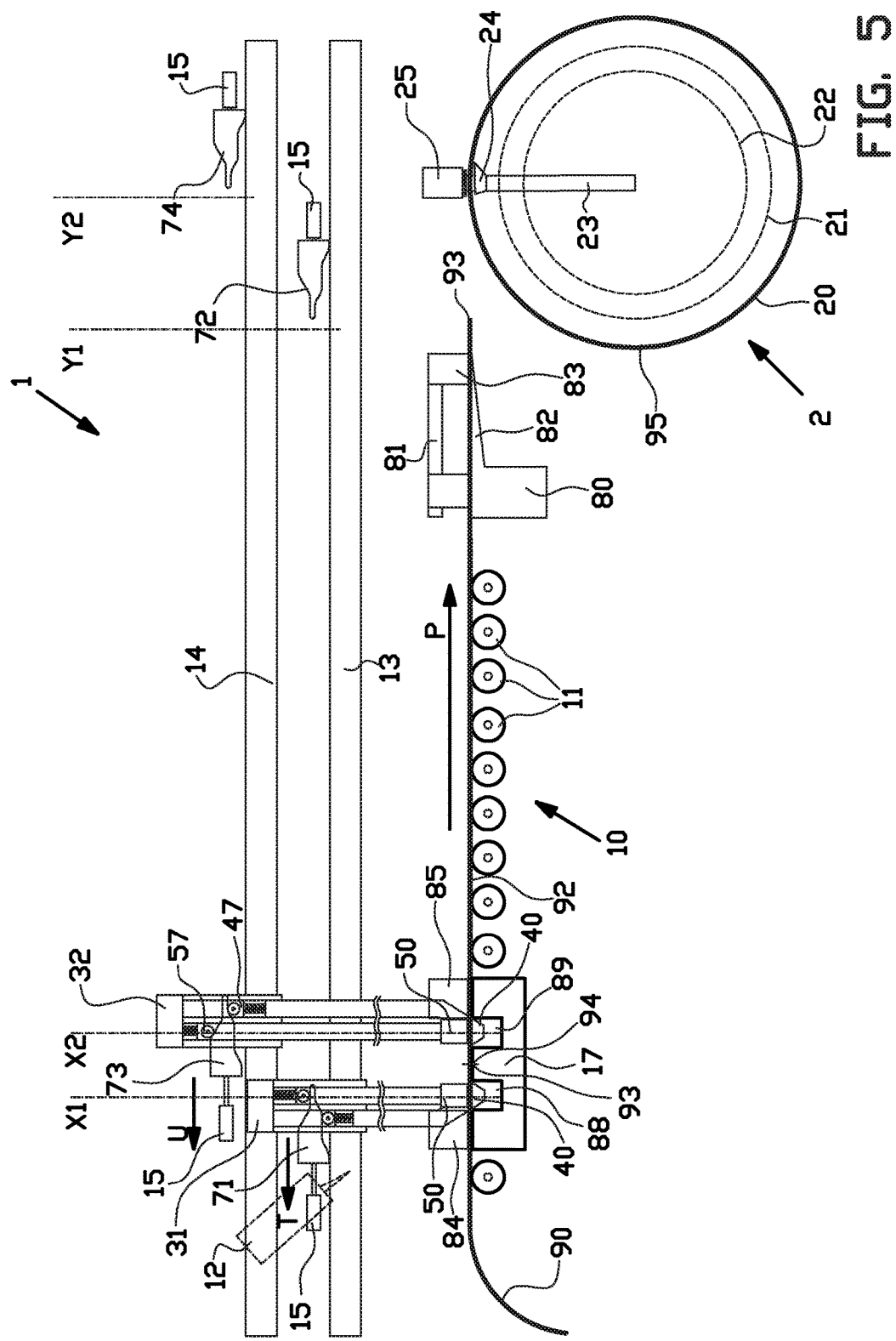

FIG. 5 shows the situation wherein the grippers 31, 32 have been moved into the recesses 88, 89 of the anvil 17. The first gripper 31 in the first recess 89 of the anvil 17 is aligned with its first gripping member 40 directly underneath and its second gripping member 50 directly above the leading end 93 of the freshly extruded apex 90 that remained after cutting, upstream of the anvil 17. The second gripper 32 in the second recess 88 of the anvil 17 is aligned with its first gripping member 40 directly underneath and its second gripping member 50 directly above the trailing end 94 of the subsequent strip 92, downstream of the anvil 17. The wedges 71, 73 can now be gradually retracted in the directions indicated with arrows T and U, to allow the gripping members 40, 50 to move towards each other in accordance with their bias. In FIGS. 14A-D, the subsequent steps of closing the first gripper 31 are shown. The second gripper 32 is closed in a similar manner.

FIG. 14A shows the situation wherein the gripping members 40, 50 of the first gripper 31 are maximally displaced by the first wedge 71. This situation is the same as the situation in FIG. 13D, except for that the first gripper 31 has now been moved into the foreground. Thus, the platform 42 of the first gripping member 40 and the pressing element 52 of the second gripping member 50 are now located directly underneath and above, respectively, the apex 90. To gently engage the apex 90, the first wedge 71 is actively retracted in the retraction direction indicated with arrow T.

FIG. 14B shows the situation wherein the first wedge 71 is partially retracted in the retraction direction T. The first wheel 47 of the first gripping member 40 has moved along the first run-on surface 76 and is gradually allowed to move upwards. As a result the first gripping member 40 has been allowed to move upwards to the '0' level in accordance with its bias. The platform 42 of the first gripping member 40 has come into abutment with the apex 90 from underneath. The second wheel 57 of the second gripping member 50 has moved over the second run-on surface 77, but is not yet allowed to move downwards.

FIG. 14C shows the situation wherein the first wedge 71 is further retracted in the retraction direction T. The second wheel 57 reaches a descent in the curvature of the second run-on surface 77 and is thus allowed to move downwards. As a result, the second gripping member 50 is now allowed to move downward in accordance with its bias to the '0' level. The pressing element 52 has now gently been brought into abutment with the apex 90 from above. The apex 90 is thus clamped from both sides by the gripping members 40, 50 at the '0' level.

The first gripper 31 is now in the closed state. The first gripper 31 has engaged the leading end 93 of the freshly extruded apex 90, upstream of the cutting surface 18, while the second gripper 32 has gently engaged the trailing end 94 of the subsequent apex strip 92.

Figure 6:
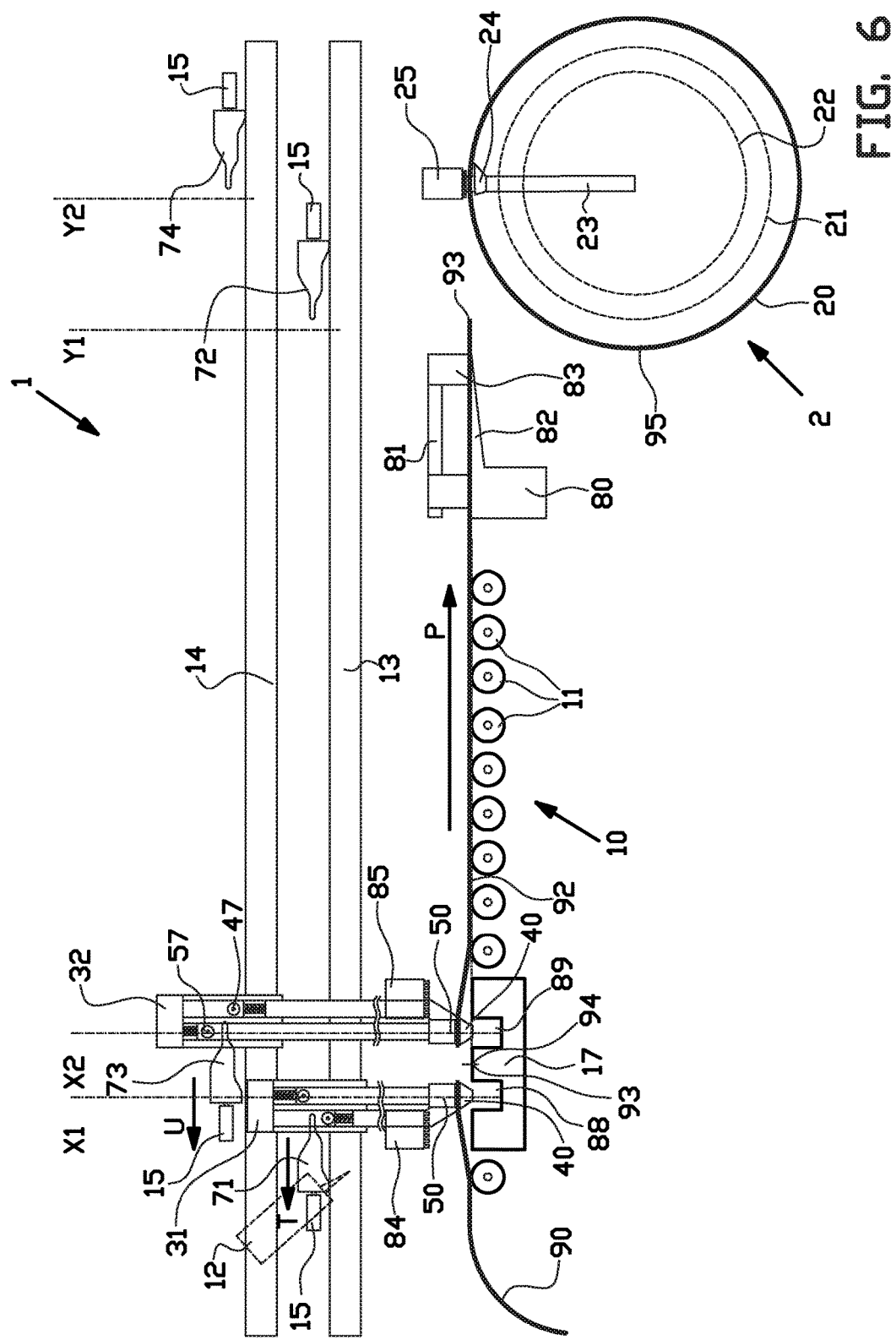

FIG. 6 shows the situation wherein the clamping blocks 84, 85 are lifted up to such a level that the pressing elements 52 of the grippers 31, 32 can pass underneath. This can be safely done as, in the previous situation as shown in FIG. 5, the leading end 93 of the apex 90 and the trailing end 94 of the subsequent apex strip 92 were already securely held by the grippers 31, 32. After the clamping blocks 84, 85 are lifted, the wedges 71, are fully retracted in the directions indicated with arrows T and U.

As shown in FIG. 14D, the further retraction of the first wedge 71 in the retraction direction T allows the gripping members 40, 50 of the first gripper 31 to move to their biased position. The gripping members 40, 50, still stationary, are jointly lifted to the '+1' level. Now, the lower gripping members 40 of the grippers 31, 32 are clear from the anvil 17 and can be moved over the anvil 17 towards the bead 95 without damaging the apex 90 or the subsequent apex strip 92.

Figure 7:
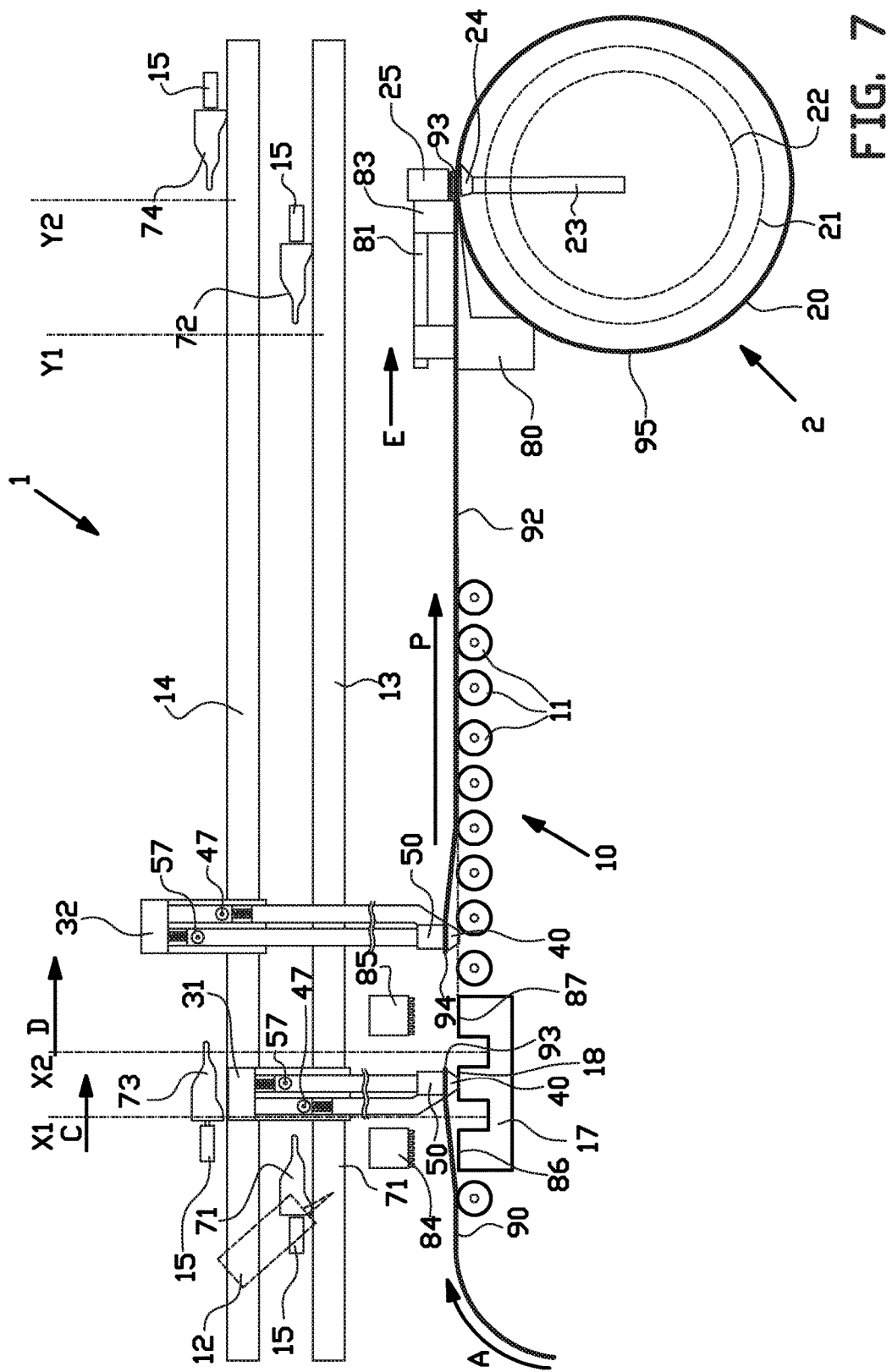

In FIG. 7 the situation is shown wherein the timing belt or the linear drive of the first rail 13 has been controlled to move the first gripper 31 away from the first start position X1 as indicated with arrow C. Simultaneously, the timing belt of the second rail 14 has been controlled to move the second gripper 32 away from the second start position X2 as indicated with arrow D. The first gripper 31 has pulled the leading end 93 of the freshly extruded apex 90 past the cutting surface 18 of the anvil 17. The second gripper 32 has guided the trailing end 94 of the subsequent apex strip 92 while the leading end 93 of the subsequent apex strip 92 is engaged and pulled by the applicator clamp 80 in the application direction E. The applicator clamp 80 and the second gripper 32 are moved in a synchronized manner to transport the subsequent apex strip 92 in a controlled manner towards the bead 95.

In the situation as shown in FIG. 7, the leading end 93 of the subsequent apex strip 92 is, or at least the part of it extending past the applicator clamp 80, is inserted into the apex clamp 23.

Figure 8:
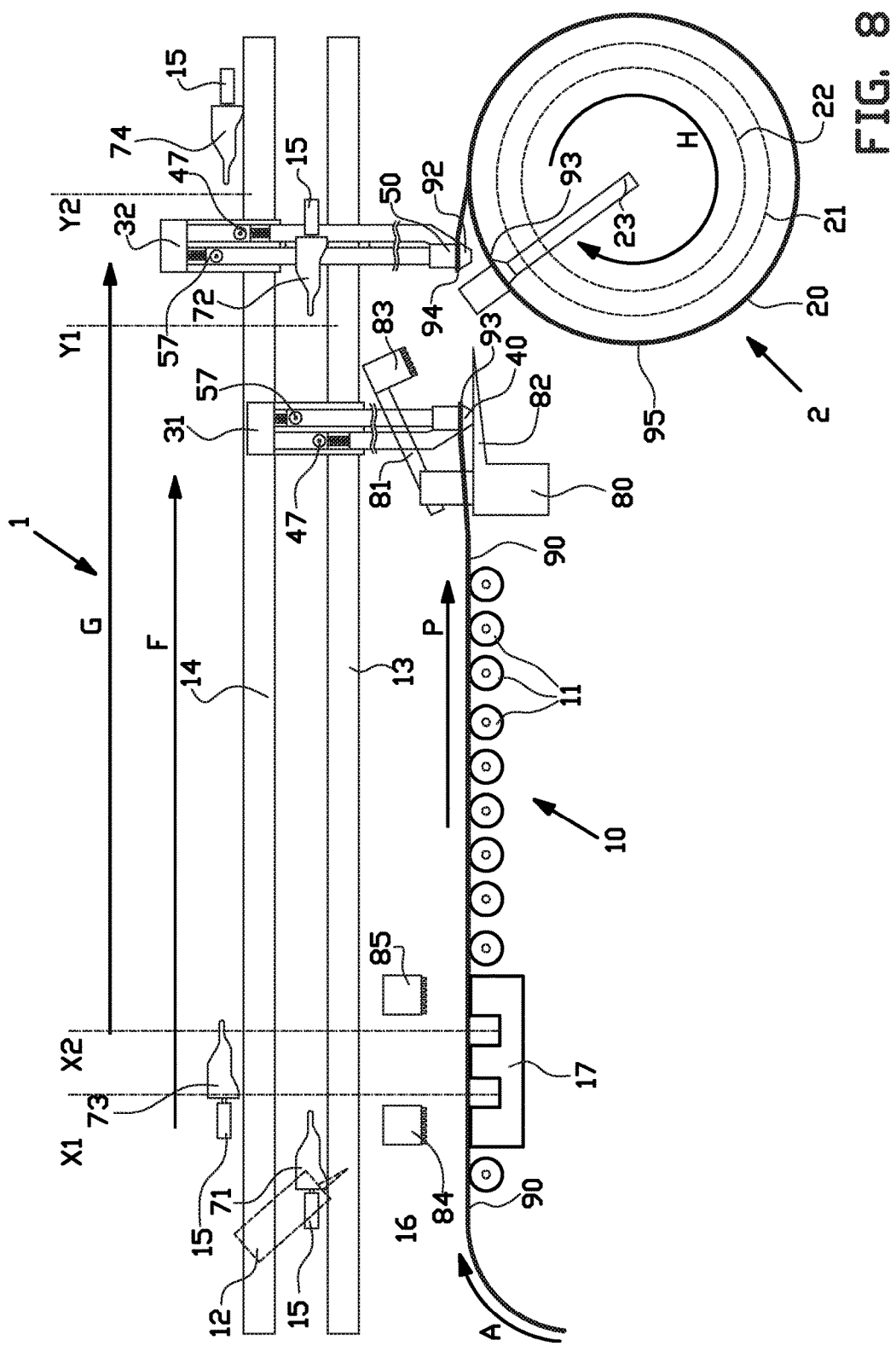

FIG. 8 shows the situation wherein the apex clamp 23 has been controlled to clamp the leading end 93 of the subsequent apex strip 92 onto the bead 95. The leading end 93 of the subsequent apex strip 92 has now been transferred from the applicator clamp 80 to the apex clamp 23. The applicator clamp 80 has opened, initially vertically and then in rotation, to release the subsequent apex strip 92. Subsequently, the apex clamp 23 is rotated concentrically about the axis of the bead holder 2 in rotational direction H to follow the physical circumferential surface 20 of the drum or the virtual drum path. During the rotation of the apex clamp 23 in the rotational direction H, the subsequent apex strip 92 is pulled around or along the bead 95, causing the subsequent apex strip 92 to adhere to the bead 95. The subsequent apex strip 92 is applied to the outside of the bead 95, perpendicular to the plane in which the bead 95 extends.

The timing belt or the linear drive of the second guide rail 14 has been controlled to move the second gripper 32 synchronously with the rotation H of the apex clamp 23 in a second transport direction G parallel to the direction of conveyance P into a position at a short distance from the second end position Y2. In this manner, the subsequent apex strip 92 can be applied to the bead 95 in a controlled manner while being clamped at both ends 93, 94.

Simultaneously, the timing belt or the linear drive of the first rail 13 has been controlled to move the first gripper 31 further in a first transport direction F parallel to the direction of conveyance P. The first gripper 31 pulls on the leading end 93 of the freshly extruded apex 90, thereby transporting the freshly extruded apex 90 over the roller conveyor 10 in the direction of conveyance P. As already described above, the applicator clamp 80 has rotated open. This allows the first gripper 31 with the freshly extruded apex 90 to move past the applicator clamp 80 into a position at or near the applicator clamp 80. In this position, the first gripper 31 is at a short distance from its first end position Y1.

Figure 9:
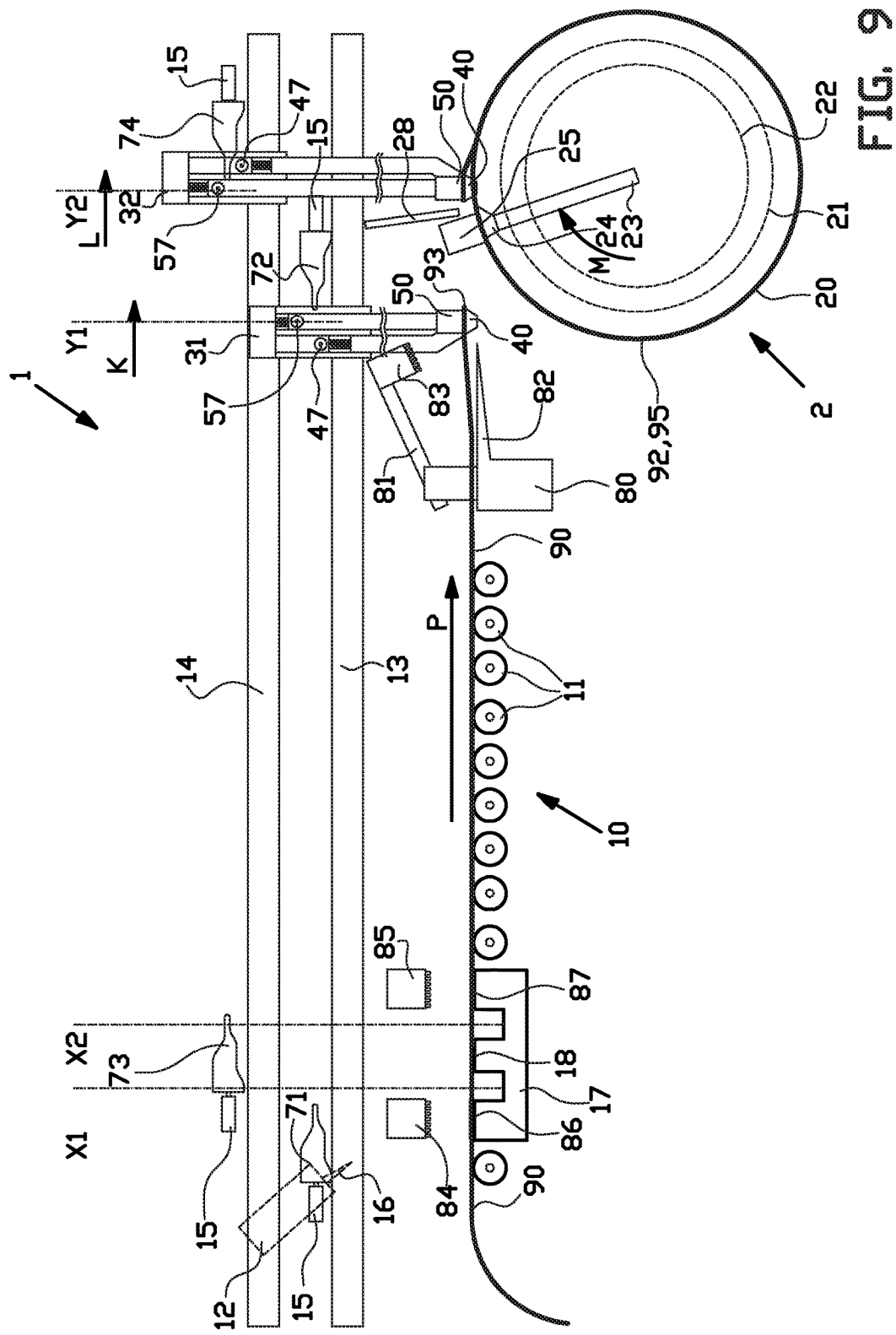

FIG. 9 shows the situation wherein the apex clamp 23 is rotated further in the rotational direction M and has almost completed a full revolution around the physical circumferential surface 20 or the virtual drum path of the bead holder 2. The timing belts or the linear drives of the guide rails 13, 14 have been controlled to move the grippers 31, 32 into their respective end positions Y1, Y2, as indicated with arrows K and L. The leading end 93 of the subsequent apex strip 92 has been pulled into straight above, yet in close proximity to the trailing end 94 of the same strip 92. From this moment onwards, steps similar to the steps of FIGS. 14A-D and FIGS. 13A-D are performed, yet in reversed order and in relation to the end positions Y1, Y2. The steps will be described hereafter, with occasional reference to FIGS. 14A-D and FIGS. 13A-D.

In the situation as shown in FIG. 9, the grippers 31, 32 are halted or held stationary at their respective end positions Y1, Y2 while the wedges 72, 74 at the end positions Y1, Y2 can be moved in a controlled manner by their respective drives 15 to move towards the grippers 31, 32.

Figure 10:
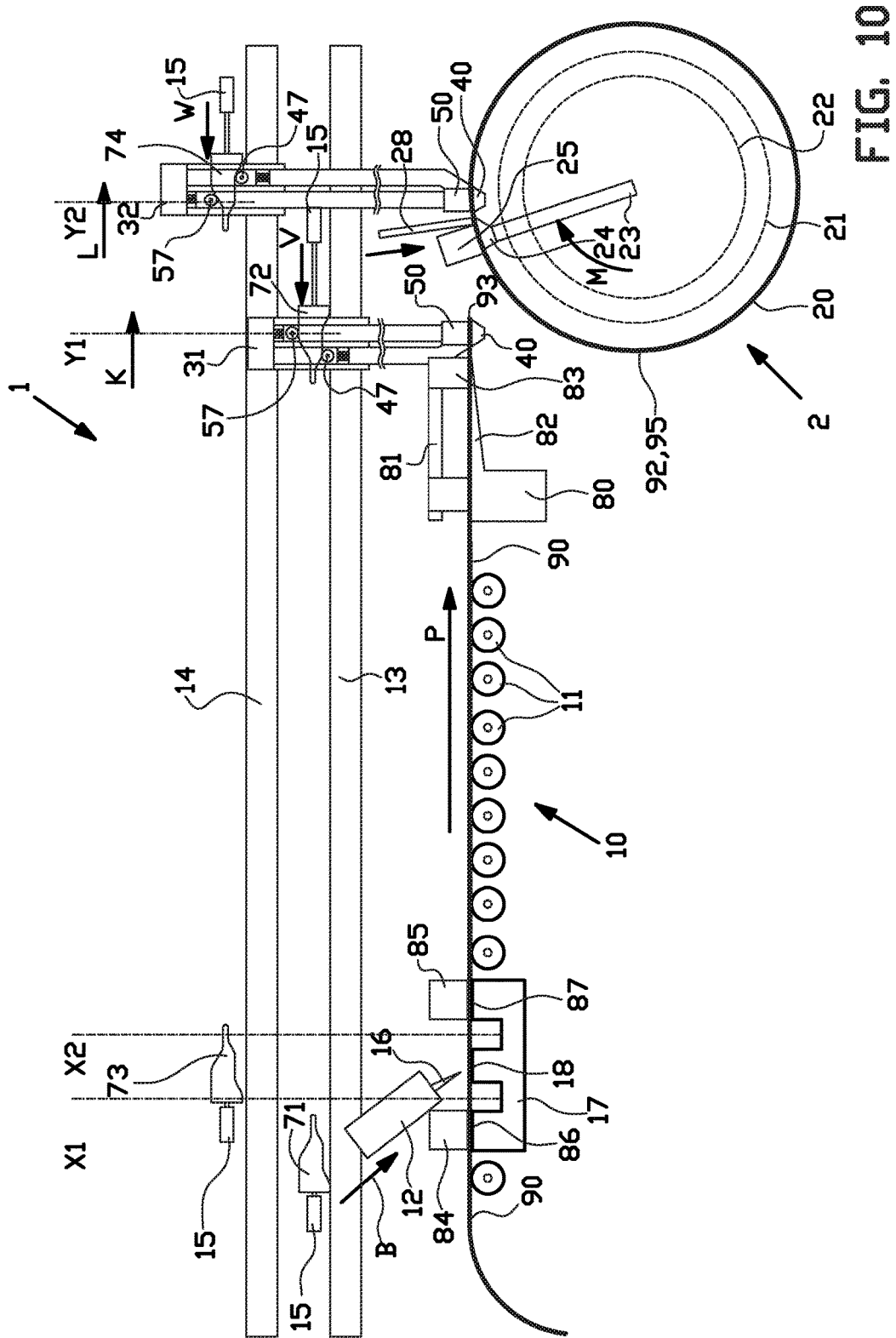

In FIG. 10, the wedges 72, 74 are only partially inserted between the gripping members 40, 50 of grippers 31, 32. This causes both grippers 31, 32 to be gently lowered to the '0' level as shown in 14C. As a result, the leading end 93 of the freshly extruded apex 90 is gently placed onto the platform 82 of the applicator clamp 80. Shortly after, the applicator clamp 80 is closed. The pressure element 83 at the end of the clamping arm 81 has, in cooperation with the platform 82, gently engaged the freshly extruded apex 90 at a short distance upstream of the place where the first gripper 31 engages the freshly extruded apex 90 at the leading end 94 thereof. At this moment, the freshly extruded apex 90 is held by both the first gripper 31 and the applicator clamp 80.

At the same time of or shortly after the clamping of the leading end 93 of the freshly extruded apex 90 by the application clamp 80, the clamping blocks 84, 85 are again brought into clamping abutment with freshly extruded apex 90 at the clamping surfaces 86, 87 on both sides of the anvil 17. Now the freshly extruded apex 90 is fully controlled and can be cut according to the steps as described in relation to FIG. 1. The cycle can thus be repeated for a next subsequent apex strip 92.

Also in FIG. 10, the trailing end 94 of the subsequent apex strip 92 is gently placed by the second gripper 32 into overlapping contact or abutment with the trailing end 94 of the same subsequent apex strip 92 to form a splice with the leading end 93 of the same strip 92. While the leading end 93 of the subsequent apex strip 92 is engaged by the apex clamp 23 and the trailing end 94 of the subsequent apex strip 92 is engaged by the second gripper 32, the stitch roller 28 is pressed against the splice between the leading end 93 and the trailing end 94 to stitch the splice and to form the subsequent apex strip 92 around or along the bead 95 to form an endless, substantially circular bead-apex assembly.

Figure 11:
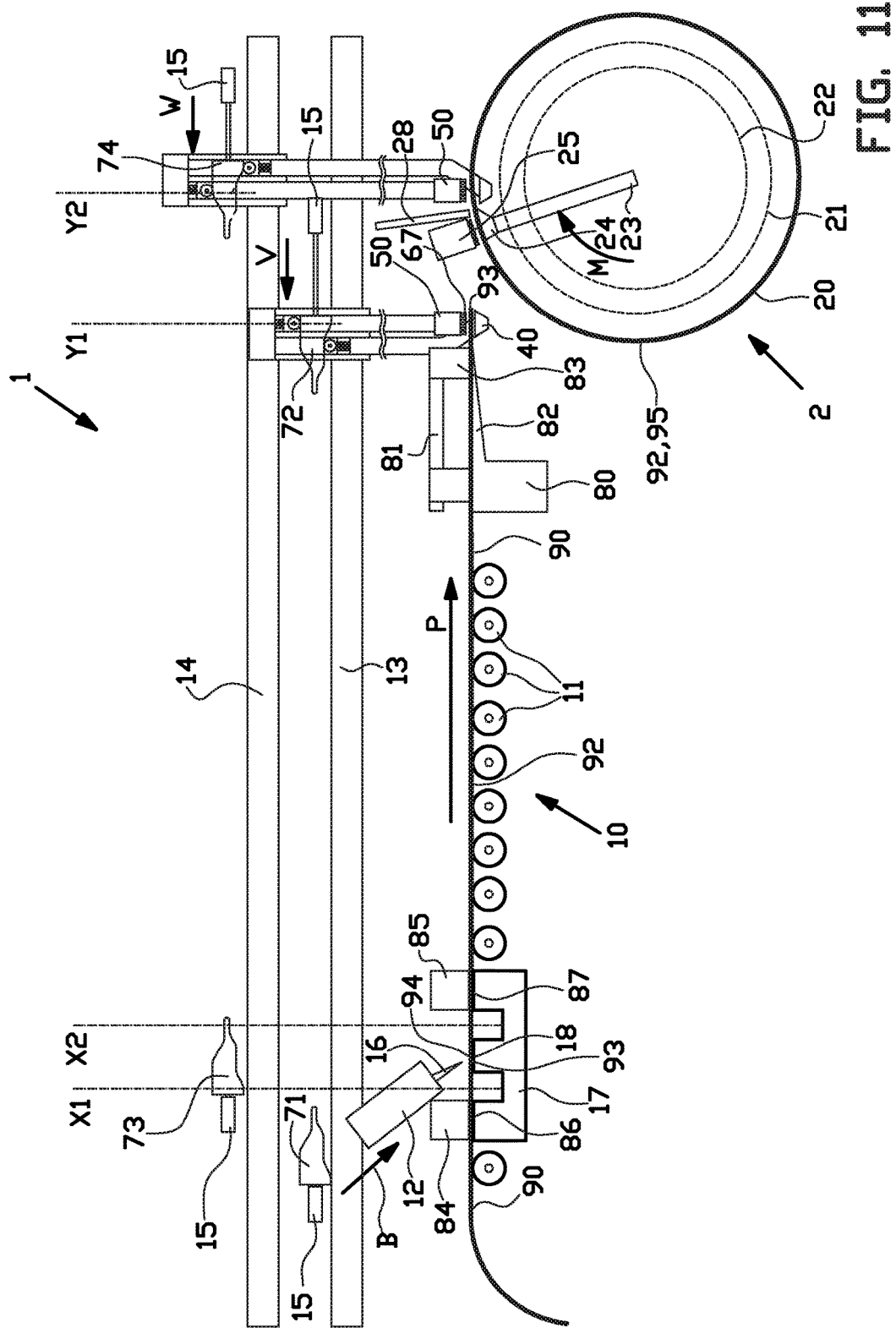

FIG. 11 shows the situation wherein the wedges 72, 74 at the end positions Y1, Y2 have continued to move in a controlled manner by their respective drives 15 in the direction of arrows V and W. The wedges 72, 74 are now fully inserted in between the gripping members 40, 50 of the grippers 31, 32. As a result, the gripping members 40, 50 of the grippers 31, 32 have been moved fully apart into the open state as shown in FIG. 14A. As a result, the gripping members 40, 50 of the grippers 31, 32 have moved apart and are no longer in engagement with the leading end 93 of the freshly extruded apex 90 and the trailing end 94 of the subsequent apex strip 92, respectively.

Starting from the situation as shown in FIG. 11, the cycle according to FIGS. 1-10 can be repeated again and again. In particular, starting from the situation as shown in FIG. 11, it is safe to again move the grippers 31, 32 from the foreground FG into the background BG, as shown in FIG. 2, without damaging the subsequently applied apex strip 92 or the next subsequent strip of apex 92 of the next cycle. The applied subsequent apex strip 92 can be considered to be the previously applied strip 91 for the next cycle. The bead-apex assembly 92, 95 that resulted from the previous cycle can be removed and the aforementioned cycle can be repeated for a new freshly extruded apex 90 which is to be cut into a new subsequent apex strip 92 in FIG. 1.

In summary, the invention relates to a tyre building machine for applying an apex to a bead to form a bead-apex assembly for a green tyre, wherein the tyre building machine comprises a first gripper and a second gripper, wherein the first gripper is moveable between a first start position and a first end position and the second gripper is moveable between a second start position and a second end position, wherein the first gripper and the second gripper are biased to engage the apex, wherein the tyre building machine is provided with wedges which are arranged for countering the bias of the grippers.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. Tyre building machine for applying apex strips to beads to form a bead-apex assembly for a green tyre, comprising:
    a bead holder for holding the beads,
    a cutting device for cutting a substantially continuous length of apex into the apex strips with the apex strips having a leading end and a trailing end with respect to the bead holder, and
    an applicator clamp for transferring the leading end of one of the strips onto one of the beads at the bead holder,
    wherein the tyre building machine comprises a first gripper and a second gripper for engaging the leading end and the trailing end, respectively, of the apex strips and moving the apex strips in a direction of conveyance in a plane of conveyance towards the bead holder,
    wherein the first gripper is moveable between a first start position and a first end position and the second gripper is moveable between a second start position and a second end position,
    wherein the tyre building machine is provided with a first wedge, a second wedge, a third wedge and a fourth wedge,
    wherein the first gripper and the second gripper each comprise a first gripping member that is suspended into a position underneath the plane of conveyance and a second gripping member that is suspended into a position above the plane of conveyance,
    wherein for each gripper at least one of the gripping members is a biased gripping member biased by a respective biasing element to move towards the other of the gripping members of that gripper for clamping the apex strips from two opposite sides of the plane of conveyance,
    wherein the first wedge is provided with a protrusion which is arranged to counteract the bias of the least one biasing element of the first gripper when the first gripper is at the first start position, the second wedge is provided with a protrusion which is arranged to counteract the bias of the at least one biasing element of the first gripper when the first gripper is at the first end position, the third wedge is provided with a protrusion which is arranged to counteract the bias of the least one biasing element of the second gripper when the second gripper is at the second start position, and the fourth wedge is provided with a protrusion which is arranged to counteract the bias of the at least one biasing element of the second gripper when the second gripper is at the second end position,
    wherein the first end position is located at the applicator clamp,
    wherein the second end position is located at the bead holder,
    wherein the tyre building machine is arranged for conveying the apex strips in a first plane, wherein the first gripper and the second gripper are moveable between the first plane and a second plane in a background with respect to the first plane, and
    wherein the grippers are arranged to be moved from their respective start positions to their respective end positions in the first plane and wherein the grippers are arranged to be returned from their respective end positions to their respective start positions in the second plane, which is behind the cutting device and the applicator clamp.

2. Tyre building machine according to claim 1, wherein the grippers are arranged to be moved from the first plane to the second plane and vice versa only when the grippers are in their respective start positions or end positions.

3. Tyre building machine according to claim 1, wherein each protrusion comprises a first run-on surface for displacing one of the at least one biased gripping members of one of the grippers in a direction opposite to its bias.

4. Tyre building machine according to claim 3, wherein each wedge is provided with a second run-on surface such that each wedge is capable of displacing both of the gripping members of one of the grippers.

5. Tyre building machine according to claim 4, wherein the first and second gripping member of the first gripper are each provided with a respective wheel for contacting a respective one of the first and second run-on surfaces of both the first and second wedges, and the first and second gripping member of the second gripper are each provided with a respective wheel for contacting a respective one of the first and second run-on surfaces of both the third and fourth wedges.

6. Tyre building machine according to claim 1, wherein the first wedge, the second wedge, the third wedge and the fourth wedge are positioned at or near the first start position, the first end position, the second start position and the second end position, respectively.

7. Tyre building machine according to claim 1, wherein the tyre building machine is provided with drives which are coupled to the wedges for moving the wedges towards or retracting the wedges away from the grippers.

8. Tyre building machine according to claim 1, wherein for each gripper a first one of the gripping members is provided with a platform for supporting the apex strips and a second one of the gripping members comprises a pressing element which comprises an array of pressure pins which face towards the platform of the corresponding gripper, wherein the pressure pins are arranged for contacting the platform of their corresponding gripper and the apex supported thereon.

9. Tyre building machine according to claim 8, wherein for each gripper the pressure pins are biased to move towards the platform of their corresponding gripper, wherein, when the gripping members are moved towards each other for each gripper to engage the apex strips, at least some of the pressure pins of each gripper are arranged for contacting the apex strips and are arranged to be pushed back against their bias as a result of said contact.

10. Tyre building machine according to claim 8,
wherein each pressing element is provided with a plurality of cylindrical bores for receiving a corresponding one of the pressure pins,
wherein each pressure pin has a shaft which is arranged to slide within a corresponding one of the cylindrical bores,
wherein each shaft has a partly non-circular, multi-planar or flattened circumference which, in combination with the corresponding cylindrical bore, creates a clearance between each shaft and the corresponding cylindrical bore, which clearance is in open communication with the outside environment at the side of each pressing element facing the corresponding platform.

11. Tyre building machine according to claim 10, wherein each shaft has at least three parts of its circumference which are arranged to be placed in sliding contact with its cylindrical bore and at least three substantially flattened faces for, in the placed condition, creating at least three clearances between each shaft and its cylindrical bore.

12. Tyre building machine according to claim 11, wherein each shaft has a circumference and the at least three substantially flattened faces of each shaft are equally distributed along its circumference.

13. Tyre building machine according to claim 12, wherein each shaft has a cross section with four flat sides of equal size.

14. Tyre building machine according to claim 10, wherein each shaft is arranged to be rotatable within its cylindrical bore, wherein the parts of the circumference of each shaft that are arranged to be in sliding contact with its cylindrical bore are parts of the same circle.

15. Tyre building machine according claim 1, wherein the cutting device is positioned upstream of the bead holder with respect to the direction of conveyance, wherein the first start position is located upstream of the cutting device and/or the second start position is located downstream of the cutting device.

* * * * *